United States Patent
Koitabashi

(10) Patent No.: US 7,813,602 B2
(45) Date of Patent: Oct. 12, 2010

(54) NON-CONTACT CONNECTOR

(75) Inventor: Hiroyuki Koitabashi, Komaki (JP)

(73) Assignee: Chubu Nihon Maruko Co., Ltd., Aichi (JP)

( * ) Notice: Subject to any disclaimer, the term of this patent is extended or adjusted under 35 U.S.C. 154(b) by 199 days.

(21) Appl. No.: 12/134,676

(22) Filed: Jun. 6, 2008

(65) Prior Publication Data

US 2009/0067074 A1    Mar. 12, 2009

(30) Foreign Application Priority Data

| Sep. 10, 2007 | (JP) | ............................. 2007-234033 |
| Dec. 20, 2007 | (JP) | ............................. 2007-328139 |
| Mar. 4, 2008 | (JP) | ............................. 2008-053416 |

(51) Int. Cl.
  *G02B 6/26* (2006.01)
  *G02B 6/42* (2006.01)
  *G02B 5/08* (2006.01)

(52) U.S. Cl. ........................... 385/26; 359/850; 359/857

(58) Field of Classification Search .................... 385/25, 385/26; 359/850, 857, 861
See application file for complete search history.

(56) References Cited

U.S. PATENT DOCUMENTS

| 4,900,117 | A | | 2/1990 | Chen |
| 5,319,726 | A | * | 6/1994 | Abney ........................... 385/26 |
| 5,420,946 | A | | 5/1995 | Tsai |
| 5,436,988 | A | * | 7/1995 | Narendran .................... 385/26 |
| 6,759,759 | B2 | | 7/2004 | Kojima et al. |
| 7,248,761 | B2 | * | 7/2007 | Schilling et al. .............. 385/25 |
| 7,526,155 | B2 | * | 4/2009 | Hirohashi et al. ............. 385/26 |
| 2006/0133799 | A1 | | 6/2006 | Koitabashi |

FOREIGN PATENT DOCUMENTS

| GB | 2 162 335 | 1/1986 |
| JP | A 58-6504 | 1/1983 |
| JP | A 2000-111718 | 4/2000 |
| JP | A 2002-75760 | 3/2002 |
| JP | 2004-208331 | 7/2004 |
| JP | A 2006-197553 | 7/2006 |

\* cited by examiner

*Primary Examiner*—Daniel Petkovsek
(74) *Attorney, Agent, or Firm*—Greer, Burns & Crain, Ltd.

(57) ABSTRACT

A non-contact connector (10), having a rotation-side light-emitting element (13) and a rotation-side light-receiving element (14), positioned on a rotating body (1) which rotates about a rotation axis (4), a fixed-side light-emitting element (23) and a fixed-side light-receiving element (24), positioned on a fixed body (2), and a first partial ellipsoidal reflecting mirror (8) installed on the fixed body (2) and a second partial ellipsoidal reflecting mirror (6) installed on rotating body (1), each with one focal point positioned on the rotation axis (4).

13 Claims, 25 Drawing Sheets

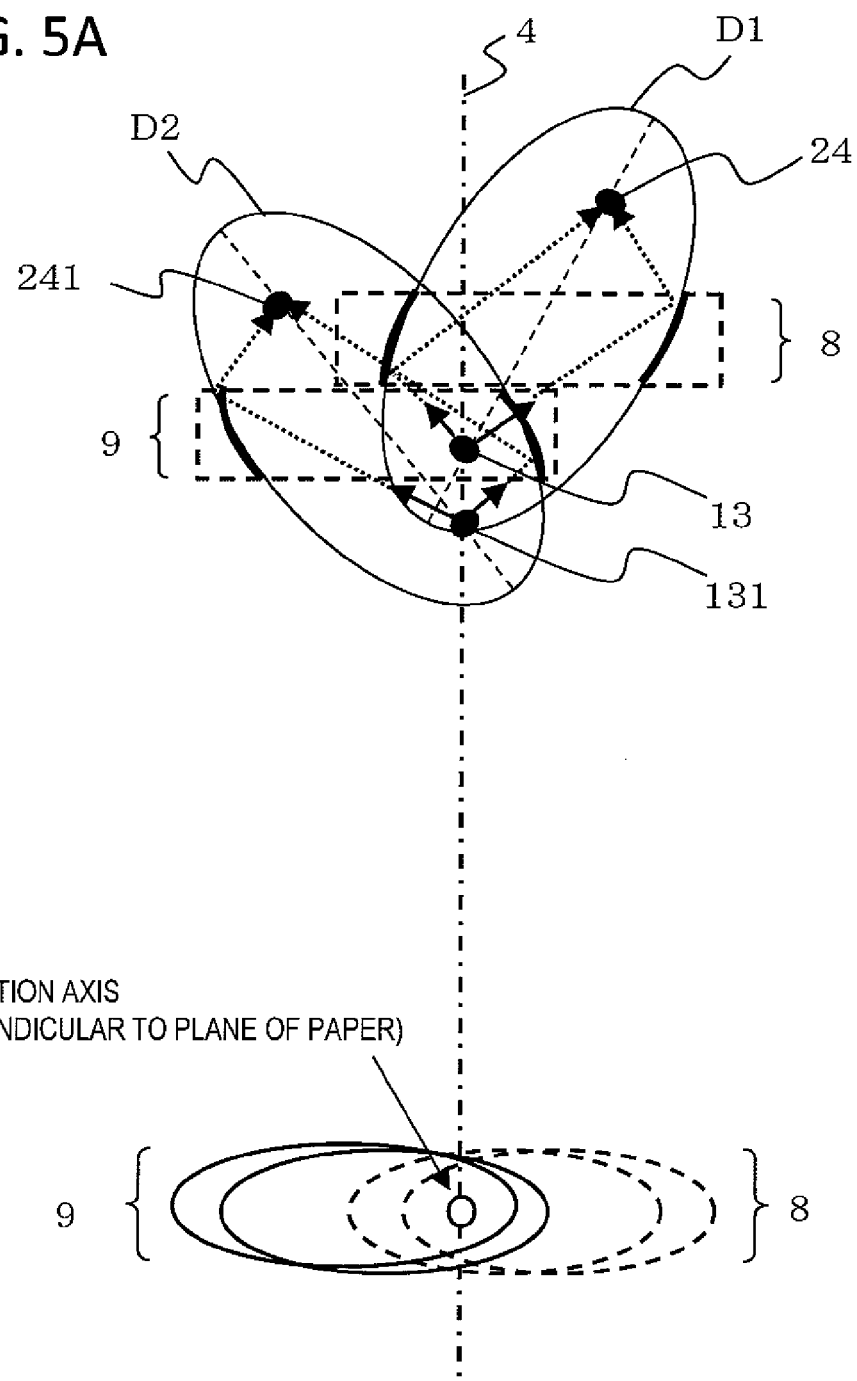

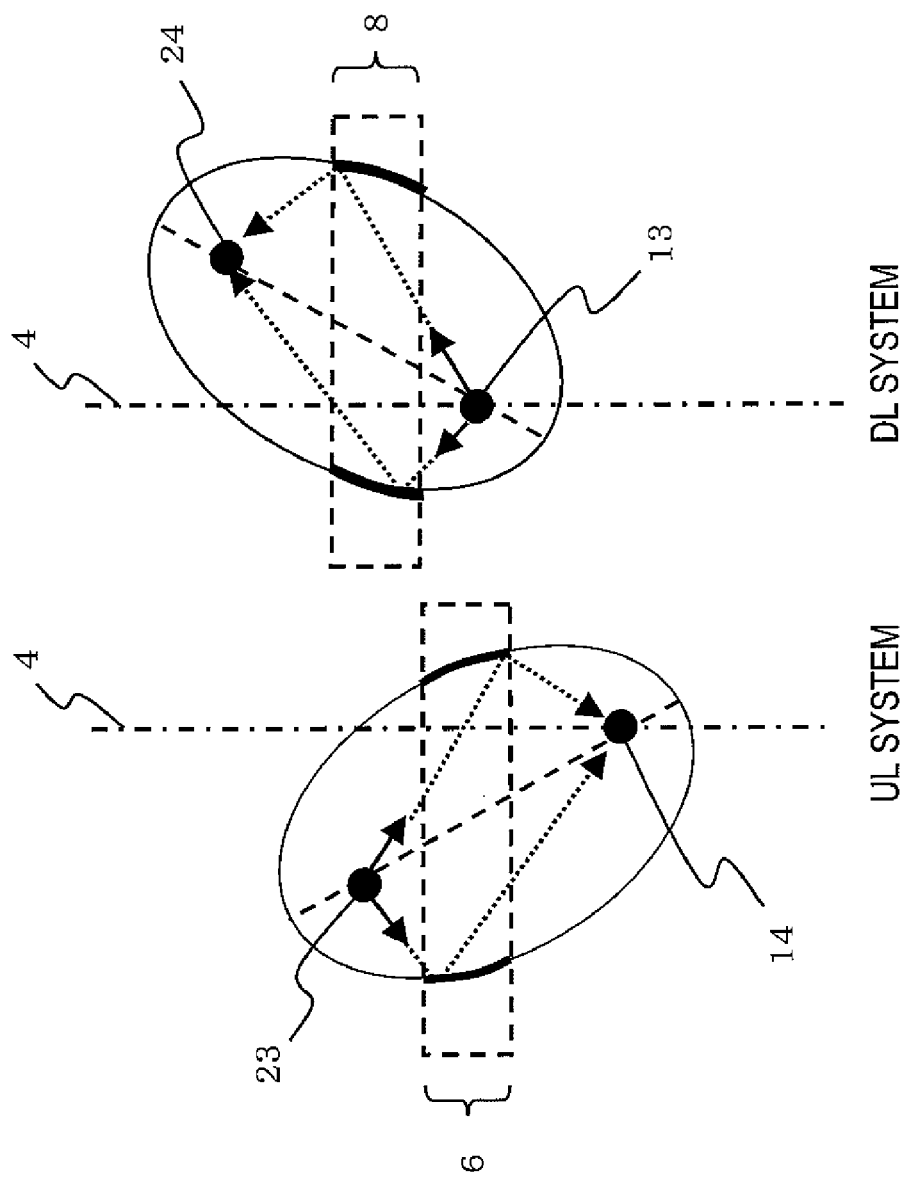
FIG. 7A  UL SYSTEM
FIG. 7B  DL SYSTEM

UL SYSTEM

DL SYSTEM

DL SYSTEM

UL SYSTEM

HYBRID CONFIGURATION USING NON-COAXIAL INSTALLATION FOR DOWNLINK, COAXIAL INSTALLATION FOR UPLINK

THREE-DIMENSIONAL ELLIPSOIDAL MIRROR METHOD USING ONLY NON-COAXIAL INSTALLATION

THREE-DIMENSIONAL ELLIPSOIDAL MIRROR METHOD USING ONLY COAXIAL INSTALLATION

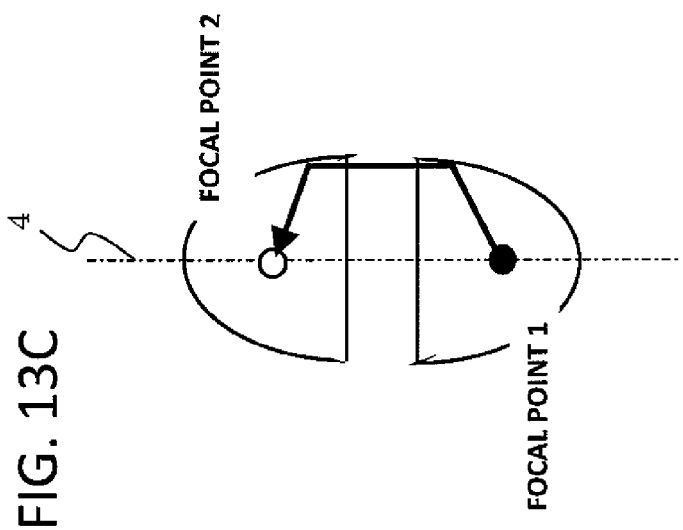
FIG. 13C MIRROR COMBINING TWO PARABOLOID MIRRORS
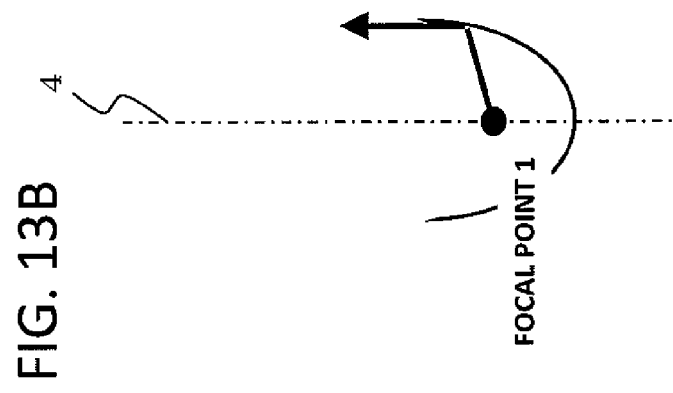
FIG. 13B SINGLE PARABOLOID MIRROR
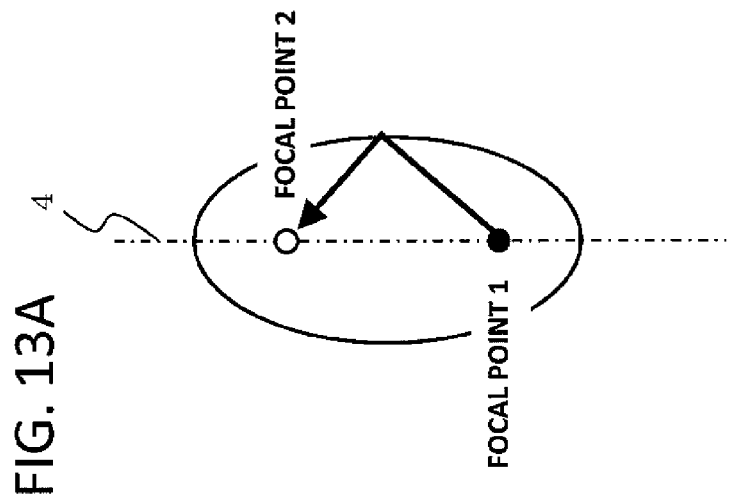
FIG. 13A ELLIPSOIDAL REFLECTING BODY

NON-CONTACT CONNECTOR

CROSS-REFERENCE TO RELATED APPLICATIONS

This application is based upon and claims the benefit of priority from the prior Japanese Patent Application No. 2007-234033, filed on Sep. 10, 2007, the prior Japanese Patent Application No. 2007-328139, filed on Dec. 20, 2007 and the prior Japanese Patent Application No. 2008-53416, filed on Mar. 4, 2008, the entire contents of which are incorporated herein by reference.

BACKGROUND OF THE INVENTION

1. Field of the Invention

This invention relates to a non-contact connector to perform data exchange without contact.

2. Description of the Related Art

With advances in wireless technology in recent years, non-contact connectors which perform data exchange without contact, while having connector functions, have begun to appear.

For example, by using a non-contact connector to connect a rotatable camera to a signal processing unit, image signals captured by the camera can be transmitted without contact to the signal processing unit.

As technology for non-contact connectors of the prior art, there are non-contact connectors, comprising a rotating body and a fixed body, in which electricity is fed from the fixed body to portions of the rotating body without contact (see for example Japanese Patent Laid-open No. 2002-75760).

Further, there are also non-contact connectors in which, by providing a reflecting mirror connected to a gear on a rotating body, and exchanging data without contact between the rotating body and the fixed body via the reflecting mirror, the continuity of high-speed communication can be secured (see for example Japanese Patent Laid-open No. 2006-197553).

However, in the invention disclosed in Japanese Patent Laid-open No. 2002-75760, light-receiving element switching must be performed, and when data is transmitted at high speed this switching cannot keep pace, so that there is the problem that the continuity of high-speed communication cannot be secured.

And, in the invention disclosed in Japanese Patent Laid-open No. 2006-197553, even though the continuity of high-speed communication can be secured, the reflecting mirror must be rotated at a specific velocity using gears, so that there are the problems that design tasks are not easy, and that the number of components is increased to the extent that gears are used, so that costs are increased.

Further, there are demands for non-contact connectors capable of transmission and reception in both directions between the rotating side and the fixed side, over numerous channels.

This invention was devised in light of the above problems, and has as an object the provision of a non-contact connector capable of multichannel bidirectional communication.

A further object of the invention is to provide a non-contact connector which secures continuity of communication.

Still a further object of the invention is to provide a non-contact connector which can easily be designed, and which is low in cost.

SUMMARY OF THE INVENTION

In order to attain the above objects, in this invention, a non-contact connector (10) has a rotation-side light-emitting element A (13) and a rotation-side light-receiving element A (14), positioned on a rotating body (1) which rotates about a rotation axis (4); a fixed-side light-emitting element A (23) and a fixed-side light-receiving element A (24), positioned on a fixed body (2); and a partial ellipsoidal reflecting mirror A (8) installed on the fixed body (2) and a partial ellipsoidal reflecting mirror A (6) installed on rotating body (1), [each] with one focal point placed on the rotation axis (4), wherein an optical path is configured between the rotation-side light-emitting element A (13) and the fixed-side light-receiving element A (24) via the partial ellipsoidal reflecting mirror A (8) which is a portion of a three-dimensional elliptical reflecting body A (500), and between the fixed-side light-emitting element A (23) and the rotation-side light-receiving element A (14) via the partial ellipsoidal reflecting mirror A (6) which is a portion of a three-dimensional elliptical reflecting body (501), and data is exchanged in a non-contact state. By this means, regardless of the position in which the rotation-side light-emitting element (13) is positioned accompanying rotation of the rotating body (1), light emitted from the rotation-side light-emitting element (13) is always directed toward a specific fixed-side light-receiving element (24) due to the condensing effect of the geometrically elliptical shape of the three-dimensional elliptical reflecting body (500) which rotates about the rotation axis (4), so that an optical path free of interruptions can be realized, and continuity of communication is secured.

Further, the above non-contact connector (10) of this invention is characterized in that a focal point of the partial ellipsoidal reflecting mirror A (8) and a focal point of a partial ellipsoidal reflecting mirror B (9) are each placed on the rotation axis (4); an optical path is configured in which light emitted from the rotation-side light-emitting element A (13) installed at a focal point of the partial ellipsoidal reflecting mirror A (8) is reflected by the partial ellipsoidal reflecting mirror A (8) and reaches the fixed-side light-receiving element A (24) installed at the other focal point of the partial ellipsoidal reflecting mirror A (8), and light emitted from a rotation-side light-emitting element B (131) installed at a focal point of the partial ellipsoidal reflecting mirror B (9) is reflected by the partial ellipsoidal reflecting mirror B (9) and reaches a fixed-side light-receiving element B (241) installed at the other focal point of the partial ellipsoidal reflecting mirror B (9); and a plurality of stages are employed to configure a plurality of optical paths directed from the rotation side toward the fixed side.

By means of installation in which the ellipse major axes of the ellipse shapes of the two reflecting bodies (8, 9) do not coincide with the rotation axis (4), a reflecting optical path from the rotation side to the fixed side, which utilizes and applies the geometrical characteristics of an ellipse between the two rotation-side light-emitting elements (13, 131) and two fixed-side light-receiving elements (24, 241), can be configured, and the continuity of multichannel communication between these elliptical shapes is secured.

Further, the above non-contact connector (10) of this invention is characterized in that a focal point of the partial ellipsoidal reflecting mirror A (6) and a focal point of a partial ellipsoidal reflecting mirror B (7) are each placed on the rotation axis (4); an optical path is configured to be symmetrical about a plane perpendicular to the rotation axis (4) with the plurality of optical paths directed from the rotation side toward the fixed side in claim 2, in which light emitted from the fixed-side light-emitting element A (23) installed at a focal point of the partial ellipsoidal reflecting mirror A (6) is reflected by the partial ellipsoidal reflecting mirror A (6) and reaches the rotation-side light-receiving element A (14) installed at the other focal point of the partial ellipsoidal reflecting mirror A (6), and light emitted from a fixed-side light-emitting element B (231) installed at a focal point of the partial ellipsoidal reflecting mirror B (7) is reflected by the partial ellipsoidal reflecting mirror B (7) and reaches a rotation-side light-receiving element B (141) installed at the other focal point of the partial ellipsoidal reflecting mirror B (7); and a plurality of stages are employed to configure a plurality of optical paths directed from the fixed side toward the rotation side.

By this means, through installation in which the ellipse axes of the two ellipse-shape reflecting bodies (6, 7) are made not to coincide with the rotation axis (4), reflection optical paths from the fixed side to the rotation side between the two fixed-side light-emitting elements (23, 231) and the two rotation-side light-receiving elements (14, 141) are configured to be symmetrical with the reflection optical paths from the rotation side to the fixed side, and multichannel data transmission and reception can be performed without contact inside of the ellipsoids.

Further, the above non-contact connector (10) of this invention is characterized in that a structure having the plurality of optical paths from the rotation side toward the fixed side, and a structure having the plurality of optical paths from the fixed side toward the rotation side, are arranged symmetrically about a plane perpendicular to the rotation axis (4), to configure a simultaneous bidirectional communication system.

By this means, through an optical path configuration method in which, for example, the rotation system of "the optical communication system from the rotation side toward the fixed side" is made the fixed system of "the optical communication system from the fixed side toward the rotation side", while on the other hand the fixed side of "the optical communication system from the rotation side toward the fixed side" is made the rotation system of "the optical communication system from the fixed side toward the rotation side", multichannel simultaneous bidirectional data exchange can be performed without contact.

Further, the above non-contact connector (10) of this invention is characterized in that a bidirectional communication system has one optical path in which light emitted from the rotation-side light-emitting element A (13) installed at a focal point of the partial ellipsoidal reflecting mirror A (8) on the rotation axis (4) is reflected by the partial ellipsoidal reflecting mirror A (8) and reaches a fixed-side light-receiving element A (24) installed at the other focal point of the partial ellipsoidal reflecting mirror A (8), and one optical path in which light emitted from the fixed-side light-emitting element A (23) installed at a focal point of the partial ellipsoidal reflecting mirror A (6) on the rotation axis (4) is reflected by the partial ellipsoidal reflecting mirror A (6) and reaches a rotation-side light-receiving element A (14) installed at the other focal point of the partial ellipsoidal reflecting mirror A (6).

By this means, data can be transmitted and received without contact, simultaneously in both directions one channel, through an optical path configuration method in which the light-emitting elements of an "optical communication system from the rotation side toward the fixed side" and of an "optical communication system from the fixed side toward the rotation side" are both installed on the rotation axis, while both the light-receiving elements are installed at a distance from the rotation axis.

Further, the above non-contact connector (10) of this invention is characterized in that a bidirectional communication system has one optical path in which light emitted from the rotation-side light-emitting element A (13) installed at a focal point of the partial ellipsoidal reflecting mirror A (8) on the rotation axis (4) is reflected by the partial ellipsoidal reflecting mirror A (8) and reaches the fixed-side light-receiving element A (24) installed at the other focal point of the partial ellipsoidal reflecting mirror A (8), and one optical path in which light emitted from the fixed-side light-emitting element A (23) installed on the rotation axis (4) is directly incident on the rotation-side light-receiving element A (14) installed in opposition on the rotation axis (4).

By this means, data can be transmitted and received without contact, simultaneously in both directions over one channel, through a hybrid-type optical path configuration method in which, although the light-emitting elements of both the "optical communication system from the rotation side toward the fixed side" and of the "optical communication system from the fixed side toward the rotation side" are installed on the rotation axis, among the light-receiving elements, the light-receiving element of the "optical communication system from the rotation side toward the fixed side" is installed at a distance from the rotation axis, while the light-receiving element of the "optical communication system from the fixed side toward the rotation side" is installed on the rotation axis.

Further, the above non-contact connector (10) of this invention is characterized in that a bidirectional communication system has one optical path in which light emitted from the rotation-side light-emitting element A (13) installed at a focal point on the rotation axis (4) of the partial ellipsoidal reflecting mirror A (8) is reflected by the partial ellipsoidal reflecting mirror A (8) and reaches the fixed-side light-receiving element A (24) installed at the other focal point of the partial ellipsoidal reflecting mirror A (8), set on the rotation axis (4), and one optical path in which light emitted from the fixed-side light-emitting element A (23) installed at a focal point on the rotation axis (4) of the partial ellipsoidal reflecting mirror A (6) is reflected by the partial ellipsoidal reflecting mirror A (6) and reaches the rotation-side light-receiving element A (14) installed at the other focal point of the partial ellipsoidal reflecting mirror A (6), set on the rotation axis (4).

By this means, data can be transmitted and received without contact, simultaneously in both directions over one channel, through an optical path configuration method in which the light-emitting elements of an "optical communication system from the rotation side toward the fixed side" and of an "optical communication system from the fixed side toward the rotation side" are both installed on the rotation axis, while both the light-receiving elements are also installed on the rotation axis.

Further, the above non-contact connector (10) of this invention further has a transformer core (16, 26) and transformer windings (15, 25) in the rotating body (1) and the fixed body (2) respectively, and is characterized in that the rotating body (1) and the fixed body (2) form a rotary transformer. By this means, for example, electricity can be fed from the fixed body (2) to the rotating body (1) without contact.

Further, the above non-contact connector (10) of this invention is characterized in further having a blind mating function, in which the rotating body (1) and the fixed body (2) are mutually mateable, and an optical path is formed between the rotation-side optical elements (13, 14) and (131, 141) and the fixed-side optical elements (23, 24) and (231, 241), regardless of the rotational position, in the direction of rotation of the rotating body (1), in which the rotating body (1)

mates. By this means, a non-contact connector having a blind mating function between the rotating body (1) and the fixed body (2) can be provided.

Further, the above non-contact connector of this invention is characterized in that the partial ellipsoidal reflecting mirror A (6) and partial ellipsoidal reflecting mirror B (7), installed on the rotating body (1), and the partial ellipsoidal reflecting mirror A (8) and partial ellipsoidal reflecting mirror B (9), installed on the fixed body (2), are respectively formed by two paraboloid reflecting bodies. By this means, a non-contact connector which is constructed by employing two condensing mirrors of paraboloid shape other than an ellipsoid as second-order curved-surface mirror shapes can be provided.

Further, the above non-contact connector of this invention is characterized in that any one among the partial ellipsoidal reflecting mirror A (6) and partial ellipsoidal reflecting mirror B (7), installed on the rotating body (1), and the partial ellipsoidal reflecting mirror A (8) and partial ellipsoidal reflecting mirror B (9), installed on the fixed body (2), is formed by one paraboloid reflecting body or by two paraboloid reflecting bodies. By this means, a non-contact connector can be provided which is formed by combining ellipsoids and paraboloid-shape condensing mirrors as second-order curved-surface mirror shapes.

Further, the above non-contact connector (10) of this invention is characterized in that the rotating-side optical elements (13, 14) and (131, 141), and the fixed-side optical elements (23, 24) and (231, 241), are constructed with optical fibers, and an optical path is formed between the optical fibers. By this means, for example, high-speed data transmission and reception over a plurality of channels can be performed without contact.

By means of this invention, a non-contact connector capable of multichannel bidirectional communication can be provided. Further, by means of this invention, a non-contact connector with the continuity of communication secured can be provided. And, by means of this invention, a non-contact connector enabling easy design and low cost can be provided.

BRIEF DESCRIPTION OF THE DRAWINGS

FIG. 5A explains a DL system configuration method using partial ellipsoidal reflecting mirrors.

FIG. 7A explains a multichannel bidirectional communication system configuration method.

FIG. 7B explains a multichannel bidirectional communication system configuration method.

FIG. 13A shows an example of the configuration of an ellipse-shape reflecting body and a paraboloid reflecting body.

FIG. 13B shows an example of the configuration of an ellipse-shape reflecting body and a paraboloid reflecting body.

FIG. 13C shows an example of the configuration of an ellipse-shape reflecting body and a paraboloid reflecting body.

DESCRIPTION OF THE PREFERRED EMBODIMENTS

Figure 1:
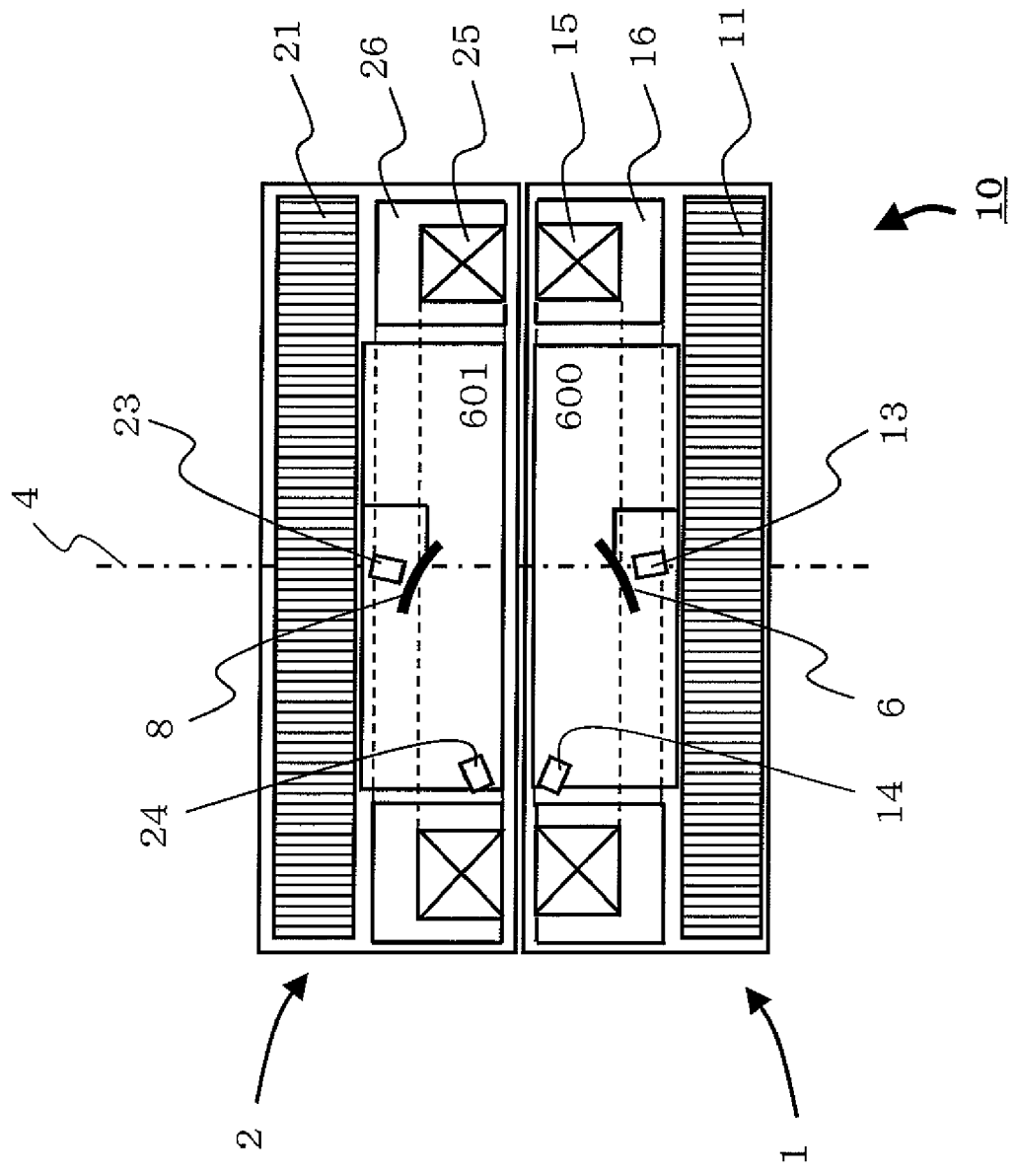
FIG. 1 shows an example of the configuration of a non-contact connector to which this invention is applied.

Below, best mode for carrying out the invention is explained, referring to the drawings.

FIG. 1 through FIG. 4 are examples showing the basic configuration and structure of a non-contact connector (10) to which this invention is applied. FIG. 1 shows the basic configuration of a non-contact connector (10); FIG. 2A through FIG. 2E show the basic configuration when a mirror surface portion is one curved surface of an ellipsoid.

Figure 3A:
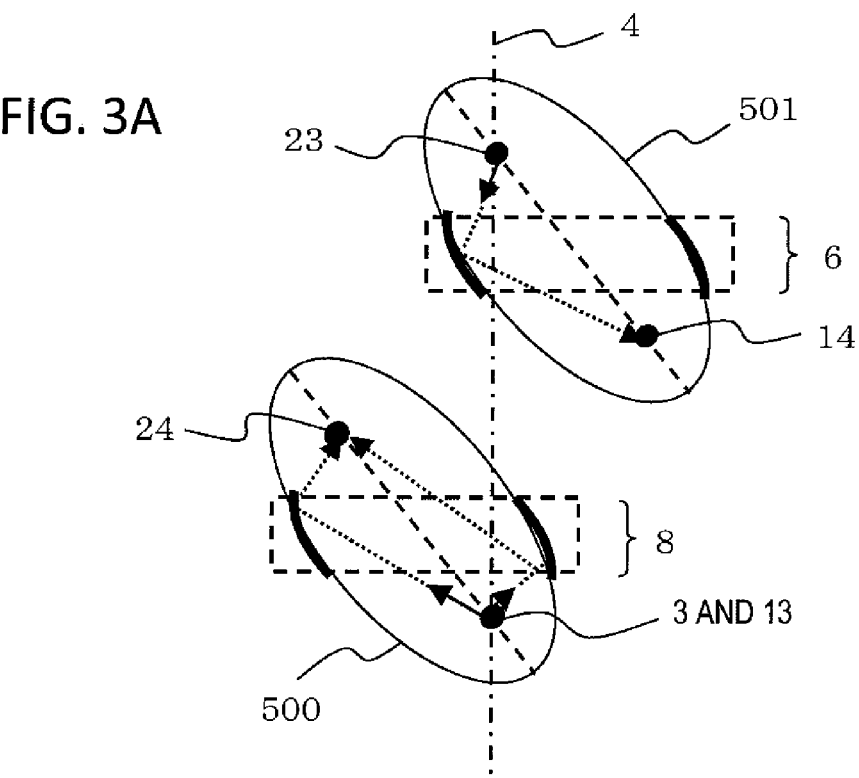
FIG. 3A shows a configuration example of a non-contact connector for a case in which a mirror surface portion is a ring-shape closed curved surface of an ellipsoid.
Figure 3B:
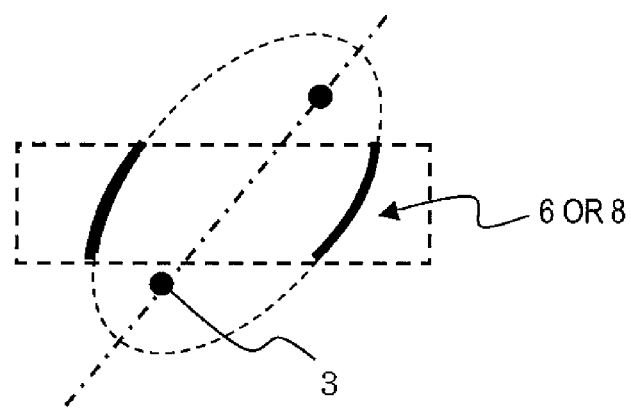
FIG. 3B shows a configuration example of a non-contact connector for a case in which a mirror surface portion is a ring-shape closed curved surface of an ellipsoid.

Further, FIG. 3A and FIG. 3B show configurations when a mirror surface portion is a closed curved surface of a ring-shape ellipsoid.

FIG. 1-1 is a cross-sectional view of a non-contact connector (10) including a rotation axis (4).

The largest constituent elements are the rotating body (1) and the fixed body (2); the rotating body (1) is configured to enable rotation about a rotation axis (4). The fixed body (2) is arranged as a portion which is stationary and opposing the rotating body (1).

The rotating body (1) comprises a rotation-side member (600) rotation-side electrical circuit unit (11), rotation-side transformer windings (15), and rotation-side transformer core (16). The fixed body (2) comprises a fixed-side member (601), fixed-side electrical circuit unit (21), fixed-side transformer windings (25), and fixed-side transformer core (26).

This invention addresses the configuration and functions of the rotation-side member (600) and fixed-side member (601), and so a detailed explanation is given below, based on FIG. 2A through FIG. 2E.

First, general optical characteristics of an ellipse described below, which are used as premises when explaining the detailed configuration and functions of the rotation-side member (600) and fixed-side member (601), are explained.

"Light emitted from one focal point of an ellipsoid is reflected by the inner surface of the ellipsoid and is always incident on the other focal point."

Figure 2A:
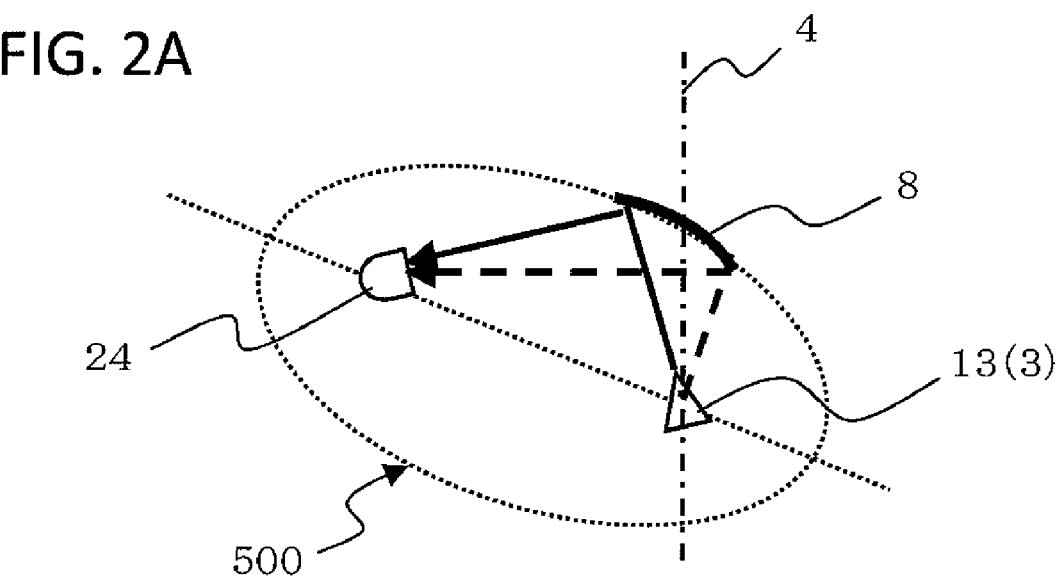
FIG. 2A shows a basic configuration example of a non-contact connector for a case in which a mirror surface portion is one open curved surface of an ellipsoid.

FIG. 2A shows the communication system from the rotation side to the fixed side; the three-dimensional elliptical reflecting body (500), which is a mirror surface in the shape of an ellipsoid (a three-dimensional elliptical curved surface), houses the rotation-side light-emitting element (13) and fixed-side light-receiving element (24), and comprises a fixed-side partial ellipsoidal reflecting mirror (8) in a portion of the closed curved surface of the three-dimensional ellipsoid (500).

And, a function of the three-dimensional elliptical reflecting body (500) is to cause light to be emitted at a specific light emission angle from the rotation-side light-emitting element A (13), installed at one focal point (3) of the three-dimensional ellipsoid (500) positioned on the rotation axis (4), and after causing reflection by the fixed-side partial ellipsoidal reflecting mirror (8), causing the light to condense on the fixed-side light-receiving element A (24) installed at the other focal point of the three-dimensional ellipsoid (500).

Figure 2B:
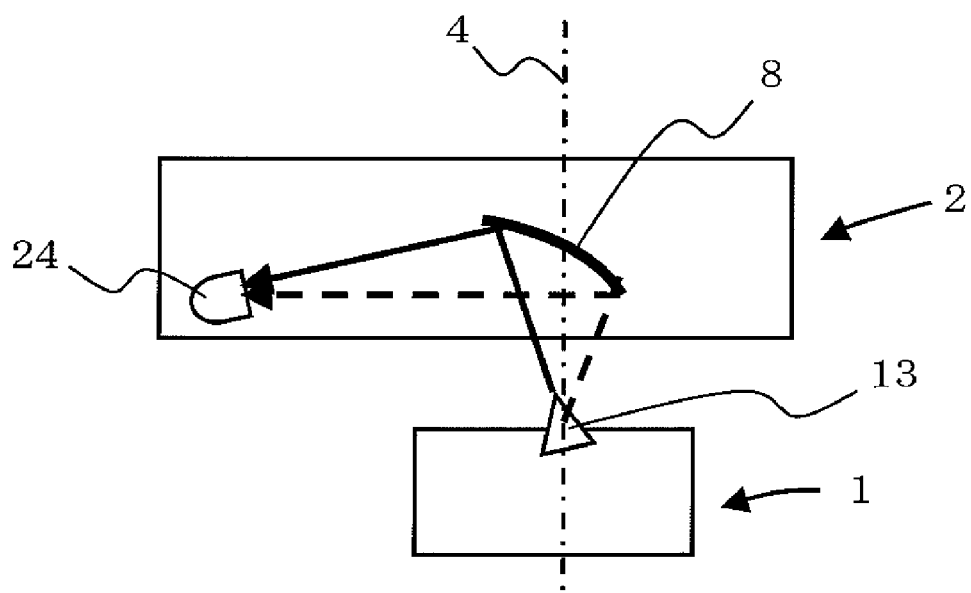
FIG. 2B shows a basic configuration example of a non-contact connector for a case in which a mirror surface portion is one open curved surface of an ellipsoid.

Next, FIG. 2B shows the structure of arrangement of the rotation-side light-emitting element (13), fixed-side light-receiving element (24), and other elements.

The rotation-side light-emitting element A (13) is installed at the axis end of the rotation axis (4) of the rotating body (1), and the fixed-side partial ellipsoidal reflecting mirror A (8) and the fixed-side light-receiving element A (24) are installed on the fixed body (2).

Figure 2C:
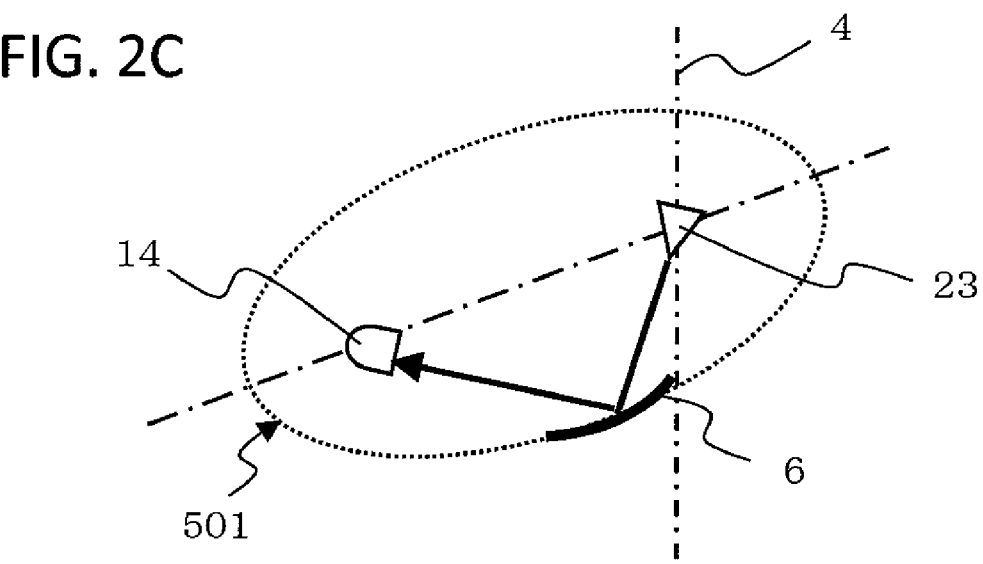
FIG. 2C shows a basic configuration example of a non-contact connector for a case in which a mirror surface portion is one open curved surface of an ellipsoid.

Next, FIG. 2C shows the communication system from the fixed side to the rotation side; the three-dimensional elliptical reflecting body (501), which is a mirror face with an ellipsoid (three-dimensional elliptical curved surface, ellipsoid) shape, houses the fixed-side light-emitting element (23) and rotation-side light-receiving element (14), and comprises the rotation-side partial ellipsoidal reflecting mirror A (6) in a portion of the closed curved surface of the three-dimensional ellipsoid (501).

And, a function of the three-dimensional elliptical reflecting body (501) is to cause light to be emitted at a specific light emission angle from the fixed-side light-emitting element (23), installed at one focal point of the three-dimensional ellipsoid (501) positioned on the rotation axis (4), and after causing reflection by the rotation-side partial ellipsoidal reflecting mirror (6), causing the light to condense on the rotation-side light-receiving element A (14) installed at the other focal point of the three-dimensional ellipsoid (501).

Figure 2D:
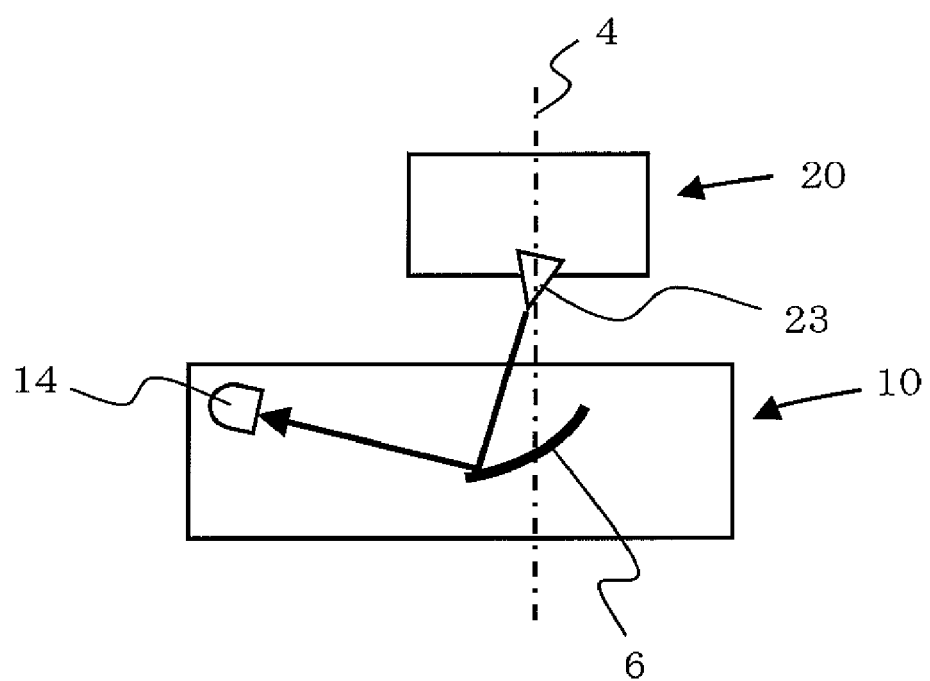
FIG. 2D shows a basic configuration example of a non-contact connector for a case in which a mirror surface portion is one open curved surface of an ellipsoid.

Next, FIG. 2D shows the structure of arrangement of the fixed-side light-emitting element A (23), rotation-side light-receiving element A (14), and other elements.

The fixed-side light-emitting element (23) is installed at the axis end of the rotation axis (4) of the fixed body (2), and the rotation-side partial ellipsoidal reflecting mirror A (6) and the rotation-side light-receiving element A (14) are installed on the rotating body (1).

Here it should be noted that elements are not configured such that light emission signals from the rotation-side light-emitting element (13) are received by the rotation-side light-receiving element (14), or such that light emission signals from the fixed-side light-emitting element (23) are received by the fixed-side light-receiving element (24).

The gist of this invention is that a configuration is employed in which light emission signals from the rotation-side light-emitting element (13) are received by the fixed-side light-receiving element (24), and in which light emission signals from the fixed-side light-emitting element (23) are received by the rotation-side light-receiving element (14).

That is, the "rotation side" of the rotation-side light-emitting element (13) and rotation-side light-receiving element (14) means "installed on the rotation side", and the "fixed side" of the fixed-side light-emitting element (23) and the fixed-side light-receiving element (24) means "installed on the fixed side".

For example, from the "rotation side" included in the name of the rotation-side light-emitting element (13), the function of "emission of light from the rotation side=installed on the rotation side" can easily be inferred. This is because the operation of a light-emitting element is to emit light, and there is only one direction for this operation.

On the other hand, in the case of the "rotation side" of the rotation-side light-receiving element (14), because a light-receiving element operates to receive light, a state of reception from two directions is possible.

That is, light emission signals from light-emitting element A (13) installed on the rotation side could be received by:
  a light-receiving element (14) "installed on the rotation side, and receiving signals from the fixed side", or by
  a light-receiving element (14) "installed on the fixed side, and receiving signals from the rotation side".

However, in the former case the light-emitting element and the light-receiving element both exist on the rotation side, which is incompatible with the required function of transmission of information from the rotation side to the fixed side, and so this name cannot be adopted.

Thus the latter case is compatible with the gist of this invention.

However, in order to clarify the function of "being installed on the fixed side", the name "fixed-side light-receiving element (24)" is employed.

Figure 2E:
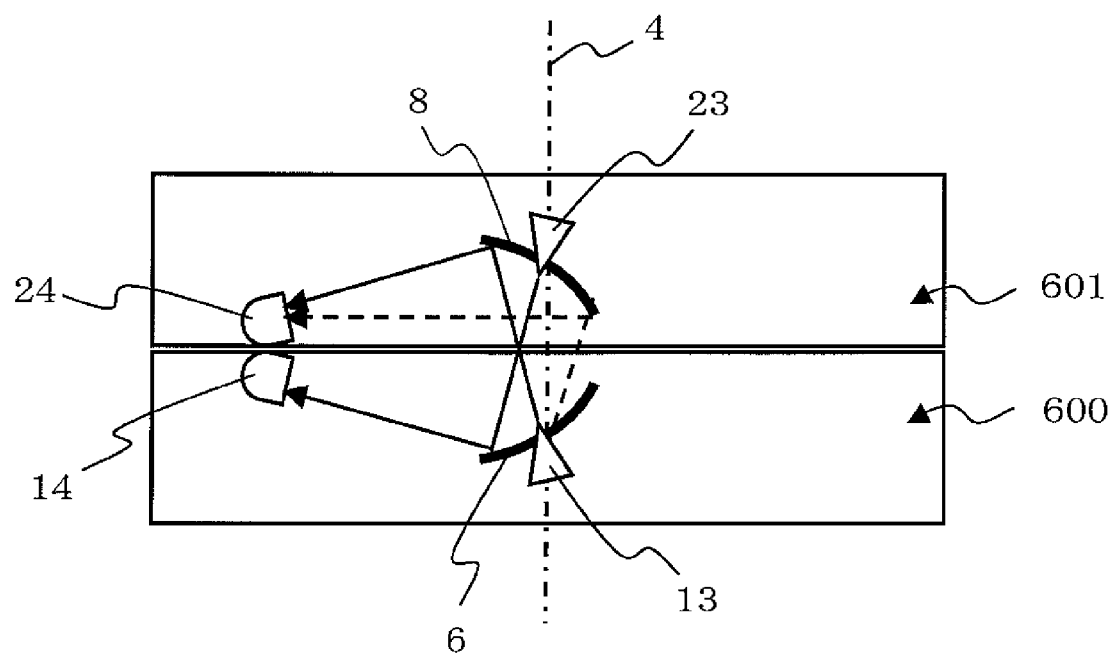
FIG. 2E shows a basic configuration example of a non-contact connector for a case in which a mirror surface portion is one open curved surface of an ellipsoid.

Drawing on the above preparatory statements, the configuration and functions of the rotation-side member (600) and fixed-side member (601) are explained, referring to FIG. 2E.

First, as is clear from FIG. 2E, the rotation-side member (600) is installed at a position at the end of the rotation axis (4) of the rotating body (1), and the fixed-side member (601) is installed, in an opposing state, at a position at the end of the rotation axis (4) of the fixed body (2).

And, the rotation-side member (600) comprises the rotation-side light-emitting element (13), rotation-side partial ellipsoidal reflecting mirror (6), and rotation-side light-receiving element (14), installed on the rotating body (1).

As stated above, the rotation-side light-emitting element (13) is a member having the function of literally emitting light from the rotation side, but the rotation-side partial ellipsoidal reflecting mirror (6) and the rotation-side light-receiving element (14) are members having the functions of "being installed on the rotation side" and "receiving signals from the fixed side".

Further, the fixed-side member (601) comprises the fixed-side light-emitting element (23), fixed-side partial ellipsoidal reflecting mirror (8), and fixed-side light-receiving element (24), installed on the fixed body (2).

In this case also, the configuration is similar to that of the rotation-side member (600), and an explanation is omitted.

Next, FIG. 3A shows a configuration example for a case in which the mirror surface portion is a ring-shape closed curved surface of an ellipsoid. In FIG. 3A, the upper ellipse diagram corresponds to FIG. 2C, and the lower ellipse diagram corresponds to FIG. 2A.

Clearly, similarly to a case in which a mirror surface portion is a single open curved surface, an optical path can be configured using such a ring-shape mirror.

The choice of whether the shape of a partial elliptical mirror is to be made a simple open curved surface or an elliptical ring shape is constrained by the mounting angle from the rotation axis (4) of the light-emitting element and other factors, and so such measures as limiting the light-emitting element mounting angle in the required specifications may be taken.

It was stated above that, as a general optical characteristic of an ellipse, "light emitted from one focal point of an ellipsoid is reflected by the inner surface of the ellipsoid and is always incident on the other focal point".

However, as stated above, and as is clear from cases in which the mirror surface portion is a single open curved surface as shown in FIG. 2A through FIG. 2E and in cases in which the mirror surface portion is a ring-shape closed curved surface as shown in FIG. 3A and FIG. 3B, if light is emitted from a light-emitting element at a specific light emission angle, the reflecting portions of the ellipsoid need not be the entire inner surface of the ellipsoid, but may be only a portion of the ellipsoid surface (as in a partial ellipsoid mirror).

To summarize, it can be said that this technique is to enable configuration of optical paths using partial ellipsoid mirrors. The invention of this technique is important, because it is fundamental to establishing multichannel communication functions.

Finally, FIG. 3B presents in detail a rectangular portion of FIG. 3A.

Hence the rectangular portion of the three-dimensional ellipsoid (500) of FIG. 3A represents the fixed-side partial ellipsoidal reflecting mirror (8), and the rectangular portion of the three-dimensional ellipsoid (501) represents the rotation-side partial ellipsoidal reflecting mirror (6), and specifically, represents the elliptical ring-shaped reflecting mirror indicated by the bold lines in FIG. 3B.

Figure 4:
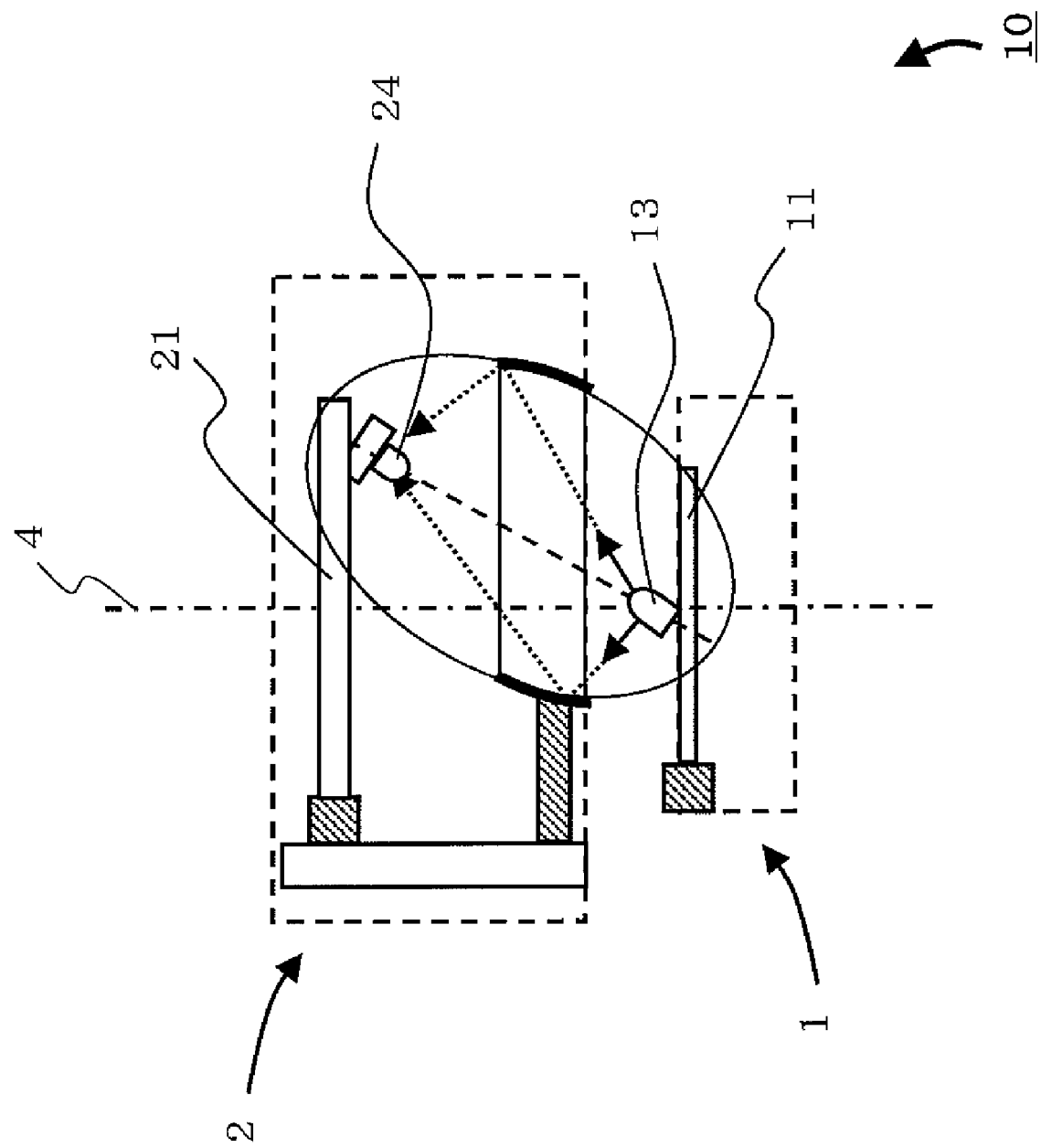
FIG. 4 shows a configuration example of a non-contact connector.

FIG. 4 shows an example of the configuration of a non-contact connector 10, when the mirror surface portion is an ellipsoidal ring-shape closed curved surface. The example shown in FIG. 4 is for only a downlink system, but an uplink system can be similarly configured.

Returning to FIG. 1, another configuration is explained. The rotation-side electrical circuit unit (11) is provided in the rotating body (1), and performs data processing of signals input from various equipment on the rotating side. For example, when the various equipment is a camera for capturing images, image signals or similar from the camera are input to the rotation-side electrical circuit unit (11), and electrical signals causing the rotation-side light-emitting element (13) to emit light are output.

Further, in order to perform communication from the fixed body (2) to the rotating body (1), the rotation-side light-receiving element (14) receives data from the fixed-side light-emitting element (23), and outputs the data to the rotation-side electrical circuit unit (11).

Next, the fixed-side electrical circuit unit (21) outputs data, input from a mechanical device provided in the fixed body (2) and on which this non-contact connector (10) is mounted, to the fixed-side light-emitting element (23).

In order to perform communication from the rotating body (1) to the fixed body (2), data received by the fixed-side light-receiving element (24) is input to the fixed-side electrical circuit unit (21), processing is performed, and data is output to the device on which fixed body (2) of non-contact connector (10) is mounted.

The rotation-side transformer windings (15) are installed in a position on the rotating body (1) opposing the fixed body (2); power is supplied from the fixed body (2) through electromagnetic inductive action, and by means of these rotation-side transformer windings (15), power can be supplied to various portions of the rotating body (1).

The rotation-side transformer core (16) is formed with a U-shape cross-section so as to surround the rotation-side transformer windings (15). The rotation-side transformer core (16) houses the rotation-side transformer windings (15) in a depression portion, forming a rotary transformer with the fixed-side transformer windings (25) and fixed-side transformer core (26) on the side of the fixed body (2).

The fixed-side transformer windings (25) are positioned on the fixed body (2), opposing the rotation-side transformer windings (15). Power is supplied to the fixed-side transformer windings (25) from a device on which the non-contact connector (10), connected to the fixed body (2), is mounted.

The fixed-side transformer core (26) is formed with a U-shape cross-section so as to surround the fixed-side transformer windings (25). The fixed-side transformer windings (25) are housed within a depression portion in the fixed-side transformer core (26), and a rotary transformer is formed with the rotation-side transformer core (16) and rotation-side transformer windings (15) on the side of the rotating body (1).

Further, the non-contact connector (10) comprises a bearing, in order to smooth the rotation operation of the rotating body (1) and to aid in positioning of the rotating body (1) and fixed body (2). The bearing is positioned in the gap between the rotating body (1) and fixed body (2). The bearing comprises a rolling element, inner ring, and outer ring; but because the load mass is small, a nonmagnetic bearing may also be used.

When smoothing of rotation operation of the rotating body (1), positioning, and similar are not necessary, the bearing can be omitted.

In the above, a communication system of one channel (hereafter abbreviated to Ch) from the rotation side to the fixed side (the downlink system, hereafter called the DL system), and a communication system of 1 Ch from the fixed side to the rotation side (the uplink system, hereafter called the UL system), have been described.

Here, 1 Ch means a communication system from one light-emitting element to one light-receiving element. Below, a communication system from a plurality of light-emitting elements to a plurality of light-receiving elements is called a multi-Ch system.

Below, multi-Ch DL systems and multi-Ch UL systems are described; first, multi-Ch DL systems are explained.

A 1 CH DL system can easily be configured by placing a light-emitting element on the rotating body (1) and a light-receiving element on the fixed body (2), in opposition on the rotation axis (4).

However, in a 2-Ch DL system, already a configuration in which the two light-emitting elements on the rotating body (1) and the two light-receiving elements on the fixed body (2) are positioned on the rotation axis (4) is not possible.

The reason is that the optical path of one Ch is blocked by the light-receiving element of the other Ch; more generally, it can be the that in a DL system of two or more Chs, optical paths cannot easily be configured by a stacked installation of light-receiving elements on the rotation axis.

There are two reasons for the difficulty, which are "on the rotation axis" and "stacked installation of light-receiving elements".

Hence possible methods of resolution include "positioning off of the rotation axis" and "distributed installation of light-receiving elements".

Here, a method of installation of light-receiving elements in which the rotation axis and the light reception axis of the light-receiving element coincide is called a coaxial installation method, and a method in which the two do not coincide is called a non-coaxial installation method.

Then, the above description of the configuration of the above 2 Ch DL system can be restated by saying that:

It is impracticable to use a coaxial installation method to configure a 2 Ch DL system.

Hence in the following, resolution of the problem by means of a non-coaxial installation method is described.

Figure 5B:
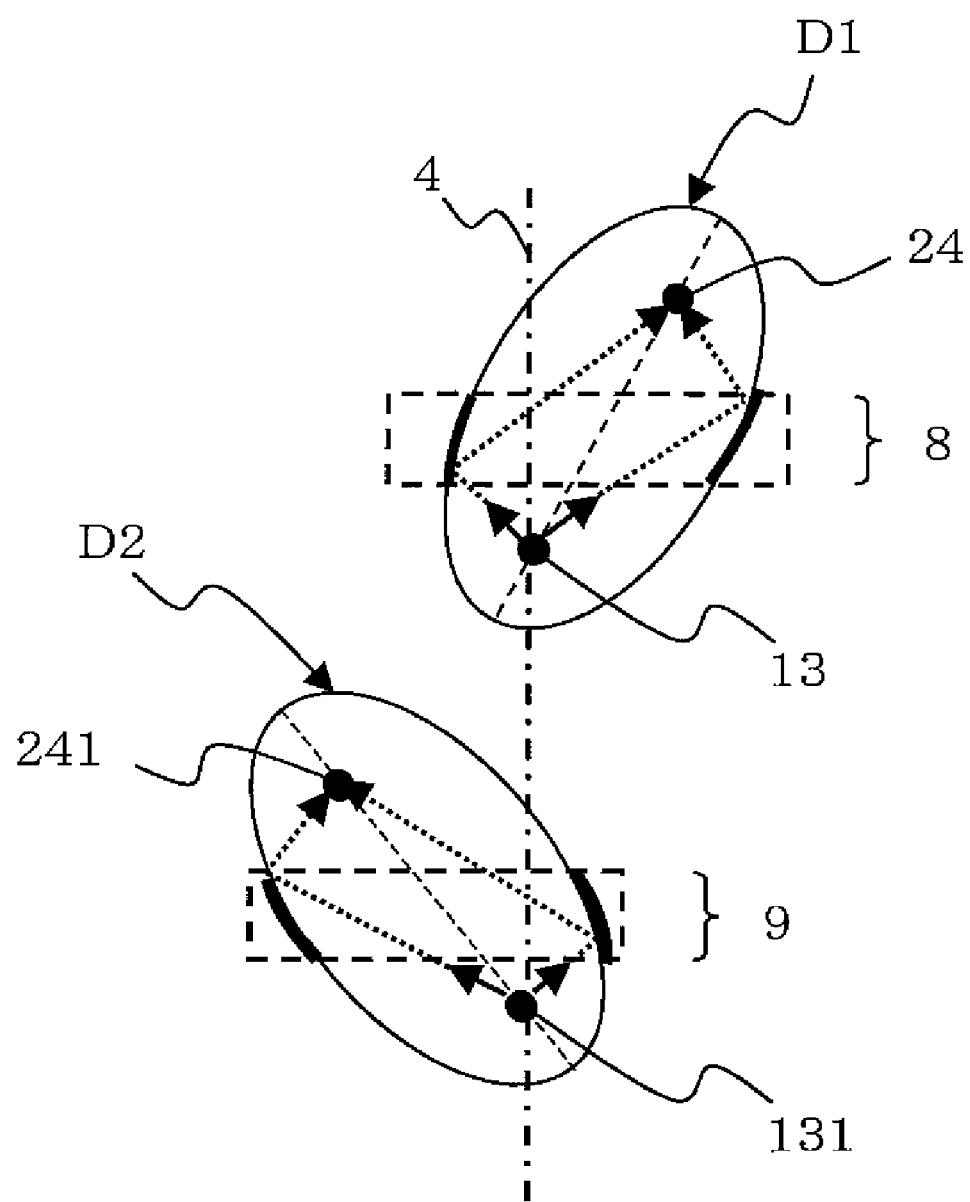
FIG. 5B explains a DL system configuration method using partial ellipsoidal reflecting mirrors.

FIG. 5A and FIG. 5B show a 2-Ch DL system based on non-coaxial installation.

First, FIG. 5A is a DL system in which ellipse D1 is used for 1 Ch, and ellipse D2 for the other Ch.

A state is shown in which the respective rotation-side light-emitting elements (13, 131) are parallel-displaced on the rotation axis (4) by the amount of the mounting member, and the fixed-side light-receiving elements (24, 241) are non-coaxially installed; however, this figure explaining the configured optical paths is complicated, and so in FIG. 5B the intervals of the rotation-side light-emitting elements (13, 131) are shown enlarged.

FIG. 5B shows the installation at focal point positions of each of the rotation-side light-emitting elements (13, 131), and shows in particular how the rotation-side light-emitting element (131) has a light emission angle such that the optical path within the ellipse is not blocked by the member mounting the rotation-side light-emitting element (13) to the rotating body (1).

Similarly, the fixed-side partial ellipsoidal reflecting mirrors (8, 9) are positioned and installed on the fixed side such that there is no superimposition.

In the state shown in FIG. 5A and FIG. 5B, a light-emitting element is added on the rotation axis, and a corresponding partial ellipsoidal reflecting mirror is added; if a light-receiving element is installed through non-coaxial installation at a focal point thereof, a DL system with 3 Ch or more can be configured.

That is, through application of a three-dimensional partial ellipsoidal reflecting mirror, stacked installation of light-emitting elements on the rotation axis, and non-coaxial installation of light-receiving elements, a multi-Ch DL system can be realized.

Next, a 2 Ch UL system (communication from the fixed side to the rotation side) is considered.

In this case also, similarly to DL systems, stacked installation of light-receiving elements on the rotation axis is difficult.

Figure 6:
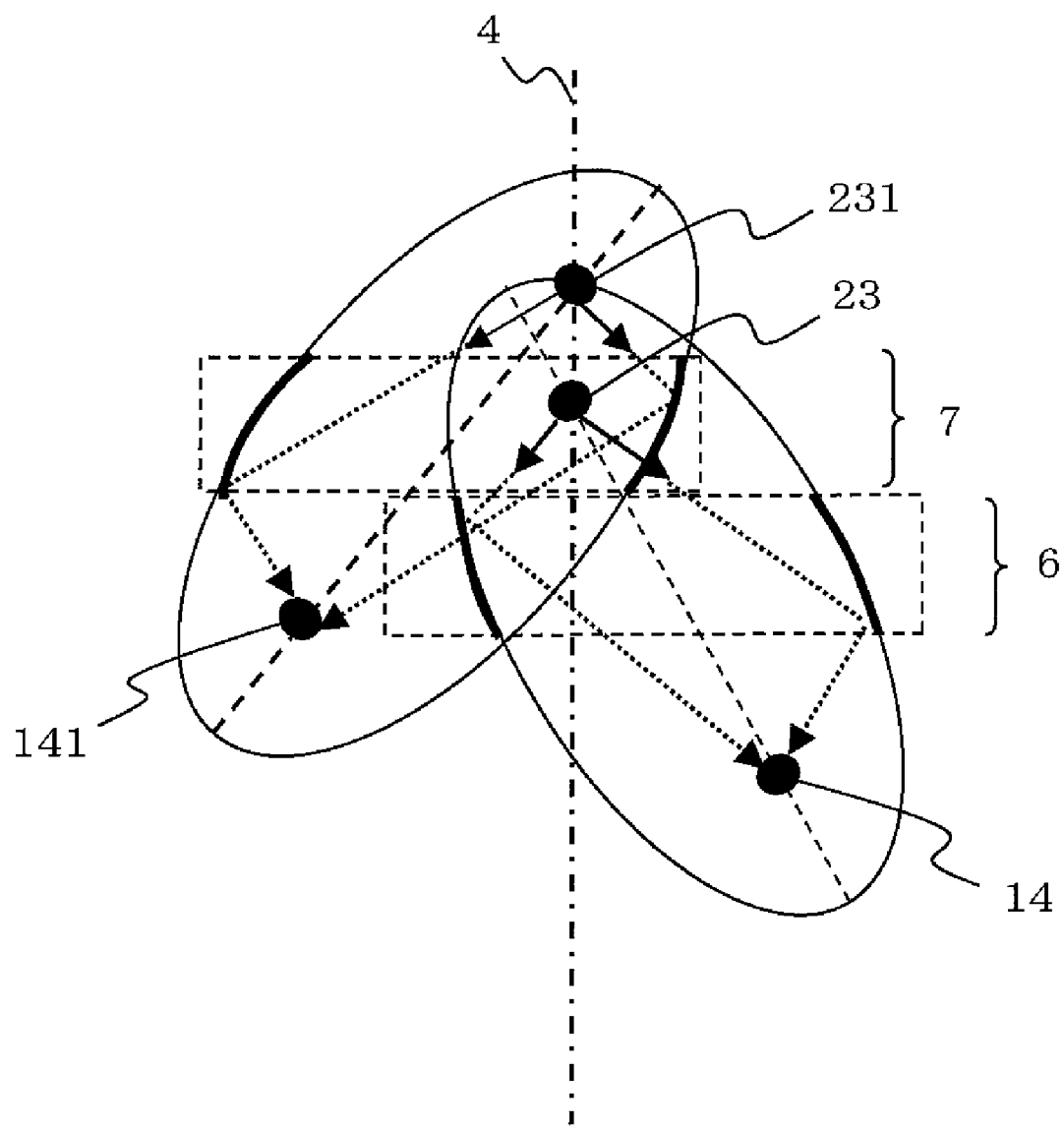
FIG. 6 explains a UL system configuration method using partial ellipsoidal reflecting mirrors.

FIG. 5A and FIG. 6 show a 2 Ch UL system (communication from the fixed side to the rotation side).

FIG. 6 is an UL system resulting from this configuration method.

As is clear from inspection, FIG. 6 is the result of construction of the DL system of FIG. 5A symmetrically about a plane perpendicular to the rotation axis (4).

This configuration method is described below.

Clearly, if a DL system is obtained, this can be regarded without modification as a UL system.

That is, the rotation-side light-emitting element (13) in FIG. 5A and FIG. 5B can be regarded as the light-emitting element installed on the fixed side. In this case, the fixed-side partial ellipsoidal reflecting mirror (8) should be regarded as on the rotation side.

That is, it is sufficient to regard the UL system construction method as equivalent to "taking the DL system rotation side to be the UL system fixed side, and taking the DL system fixed side to be the UL system rotation side".

As a result, it is sufficient to construct the UL system similarly to the DL system, symmetrically about a plane perpendicular to the rotation axis (4).

Here, additional marks are made regarding FIG. 6.

The fixed-side light-emitting elements (23, 231) in FIG. 6 are fixed on the fixed side, and so the light emission directions should be regarded as tracing beams limited to a single direction.

However, in order to represent the fact that the construction is possible by inversion of FIG. 5A, and to indicate the regions in which the rotation-side partial ellipsoidal reflecting mirrors (6, 7) are necessary, in FIG. 6 the light emission direction is not emended to a single direction.

From the above, clearly a multi-Ch UL system can also be constructed.

Below, an explanation is given from the viewpoint of relative motion of the above members.

The communication system from the rotation side (the DL system) is a communication system for a state in which the rotation side rotates and the fixed side is stationary, but from the viewpoint of relative potion, this communication system state is as seen from the fixed side.

If this DL system is seen as in "a state in which the fixed side rotates and the rotation side is stationary", then the system becomes a communication system seen from the rotation side.

As has been explained until this point based on FIG. 5A and FIG. 5B, as the configuration method when constructing a DL system, given "a state in which the rotation side rotates and the fixed side is stationary", the communication optical paths are constructed. This is "a communication system in which the communication system is constructed on the rotation side as seen from the fixed side". (This is called a DL system.)

Conversely, if "a communication system in which the communication system is constructed on the fixed side as seen from the rotation side" is created, this would be a UL system.

That is, "a communication system seen from the rotation side" is a communication system in "a state in which the fixed side rotates and the rotation side is stationary". (This is Called a UL System.)

In conclusion, upon considering a DL system from an inverted viewpoint and installing on the fixed side, a UL system results.

Next, an approach to realizing simultaneous bidirectional communication functions over a plurality of channels is considered.

Single-directional communication systems, which are a multi-Ch DL system and a multi-Ch UL system, have already been constructed, and so the remaining problem is the method of combining the DL system and the UL system.

A method of realizing simultaneous bidirectional communication functions over a plurality of channels is described, based on FIG. 7A through FIG. 10C.

Figure 7C:
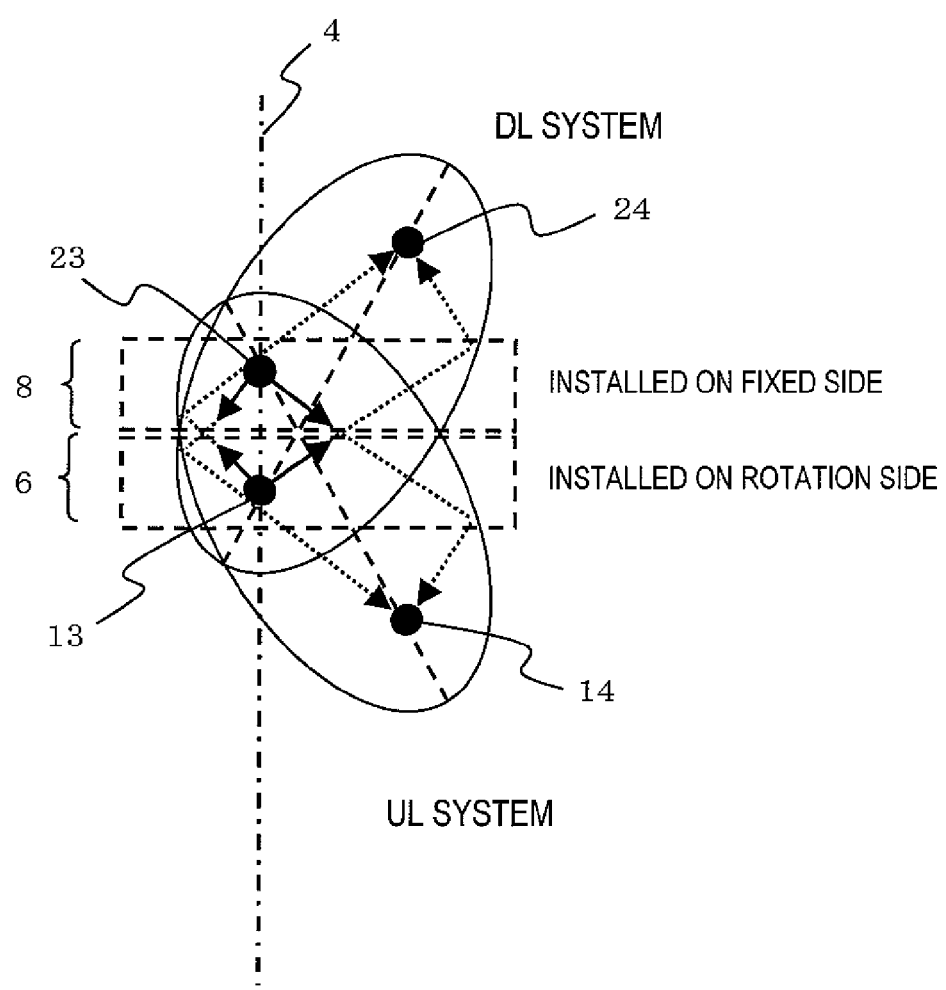
FIG. 7C explains a multichannel bidirectional communication system configuration method.

FIG. 7A through FIG. 7C show a method of construction of a 1-Ch bidirectional communication system.

First, FIG. 7A shows an UL system and FIG. 7B shows a DL system, while FIG. 7C shows a bidirectional state combining both.

If a DL system has been constructed, a UL system has a structure symmetric with the DL system, and so it is sufficient merely to combine the two such that the respective partial ellipsoidal reflecting mirrors (6, 8) do not overlap; because the UL system and DL system are symmetrical about the center points on the rotation axis (4) on the rotation side and on the fixed side, a bidirectional structure can be constructed.

Figure 8C:
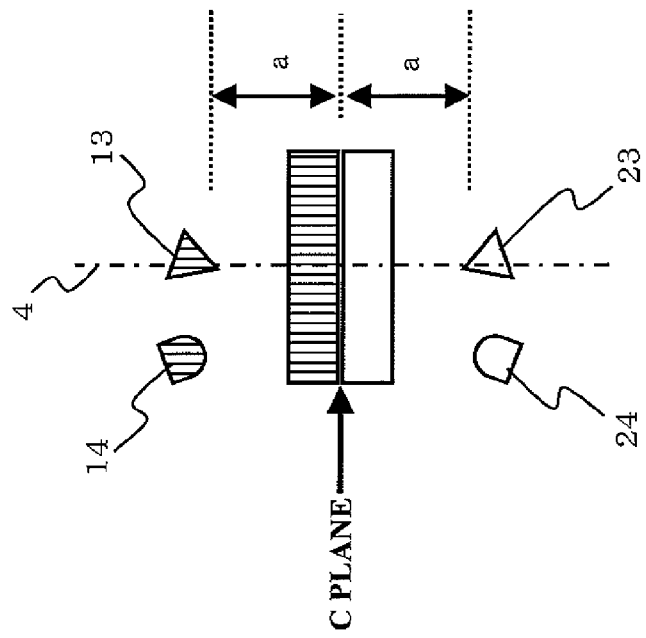
FIG. 8C explains a multichannel bidirectional communication system configuration method.
Figure 8B:
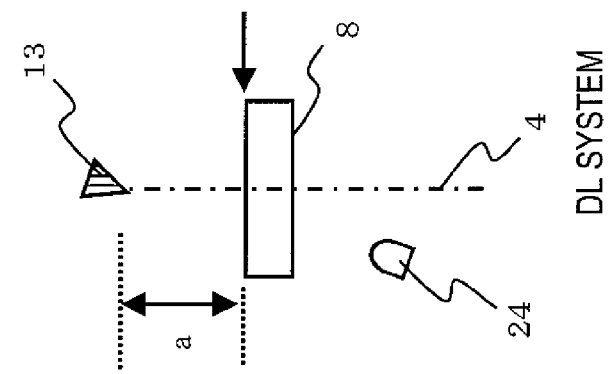
FIG. 8B explains a multichannel bidirectional communication system configuration method.
Figure 8A:
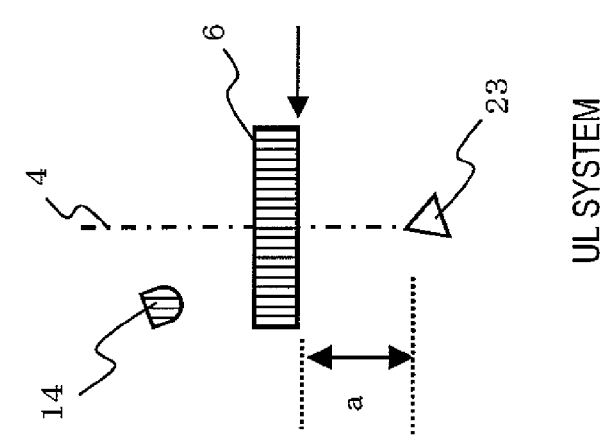
FIG. 8A explains a multichannel bidirectional communication system configuration method.

Details of this system are explained using FIG. 8A through FIG. 8C.

FIG. 8A through FIG. 8C schematically show the UL system of FIG. 7A and the DL system of FIG. 7B.

In order to construct a bidirectional system, the UL system fixed-side light-emitting element (23) should be installed on the fixed side, and the rotation-side partial ellipsoidal reflecting mirror (6) and rotation-side light-receiving element (14) should be installed on the rotation side, while the DL system rotation-side light-emitting element (13) should be installed on the rotation side, and the fixed-side partial ellipsoidal reflecting mirror (8) and fixed-side light-receiving element (24) should be installed on the fixed side.

In order to clarify this, in FIG. 8A through FIG. 5C the members which are to be installed on the rotation side are indicated by shaded elements, while members to be installed on the fixed side are differentiated as elements without shading.

Clearly, shaded elements and unshaded elements coexist in both the UL system and in the DL system.

In order to construct a bidirectional system, starting from these coexisting shaded elements and unshaded elements, the shaded elements of the UL system and the shaded elements of the DL system must be integrated, and the unshaded elements of the DL system and the unshaded elements of the UL system must be integrated.

Then, in the case of this schematic diagram, it can be seen that by combining elements such that the arrow portions of the UL system are the most extreme tips on the rotation side, and that the arrow portions of the DL system are the most extreme tips on the fixed side, separation is possible.

Hence a state in which these arrow portions are combined at an opposing plane (called the C plane) is shown in FIG. 8C. Clearly, the distance from the rotation-side light-emitting element (13) to the C plane and the distance from the fixed-side light-emitting element (23) to the C plane are both a, and the UL system and DL system are symmetric with respect to the combining plane. (Because there is no change in the positional relationships of the light-receiving elements and the arrow lines, the symmetry of the light-receiving elements is obvious.)

Below, the validity of this method of combination of a UL system and DL system is discussed.

FIG. 9A through FIG. 9D are diagrams of element arrangement, which further simplify the UL system and DL system of FIG. 8A and FIG. 8B.

Figure 9A:
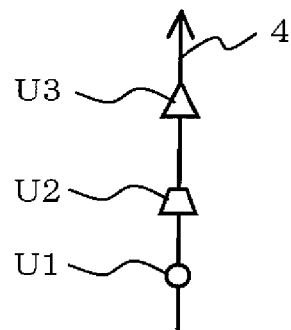
FIG. 9A explains a multichannel bidirectional communication system configuration method.

First, FIG. 9A shows, as U1, U2 and U3 respectively, points projected onto the rotation axis (4) from the fixed-side light-emitting element (23), an arbitrary point on the rotation-side partial ellipsoidal reflecting mirror (6), and the rotation-side light-receiving element (14), forming the UL system.

Here, the reason for using projected points is that, because the light-receiving element is installed non-coaxially, it is not present on the rotation shaft (4), but can be considered in simplified form as a projected point for purposes of discussing symmetry.

Figure 9B:
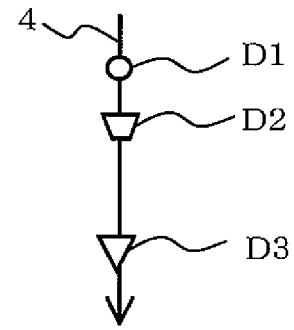
FIG. 9B explains a multichannel bidirectional communication system configuration method.

In FIG. 9B, D1, D2 and D3 respectively represent points projected onto the rotation axis (4) from the rotation-side light-emitting element (13), an arbitrary point on the fixed-side partial ellipsoidal reflecting mirror (8), and the fixed-side light-receiving element (24), forming the DL system.

As explained above, the UL system and DL system are in a relation of vertical symmetry.

Figure 9C:
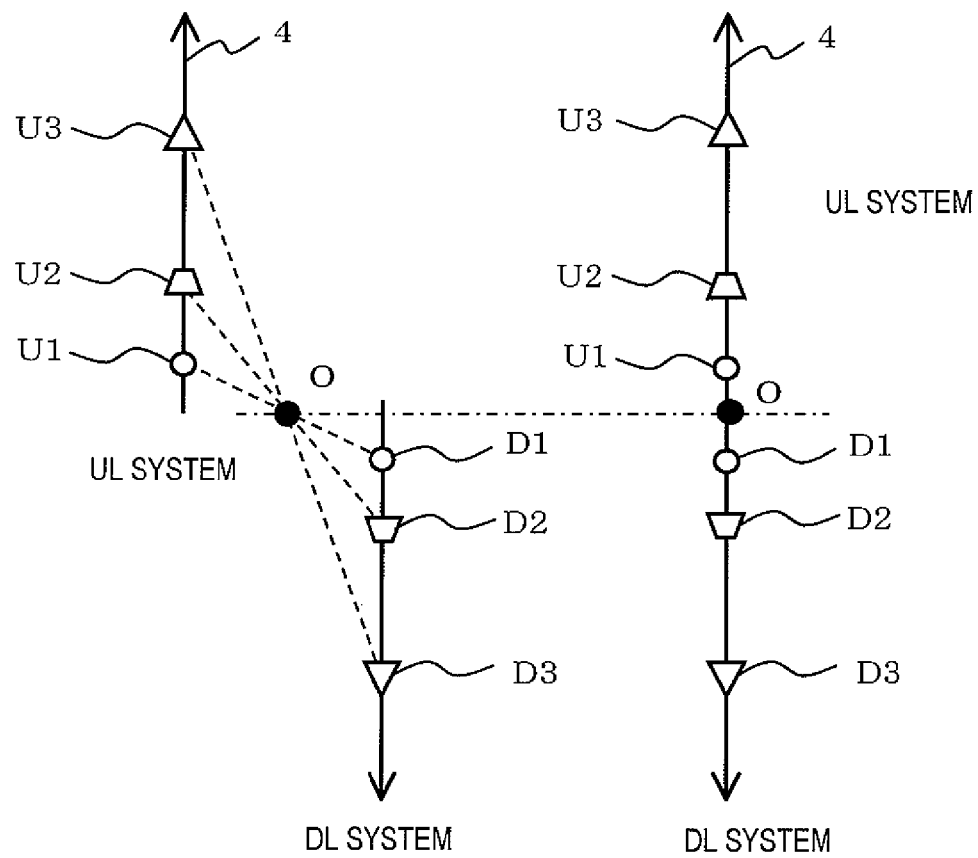
FIG. 9C explains a multichannel bidirectional communication system configuration method.

In FIG. 9C, taking O to be an arbitrary point off the rotation axis (4) in the UL system, and determining the line segments which are point-symmetric about O as the DL system, then the arbitrary point O is the return point when configuring a bidirectional system. When point O is taken to be the return point on the rotation axis (4) for the UL system and DL system and the two are superposed, the figure on the right in FIG. 9C is obtained.

Figure 9D:
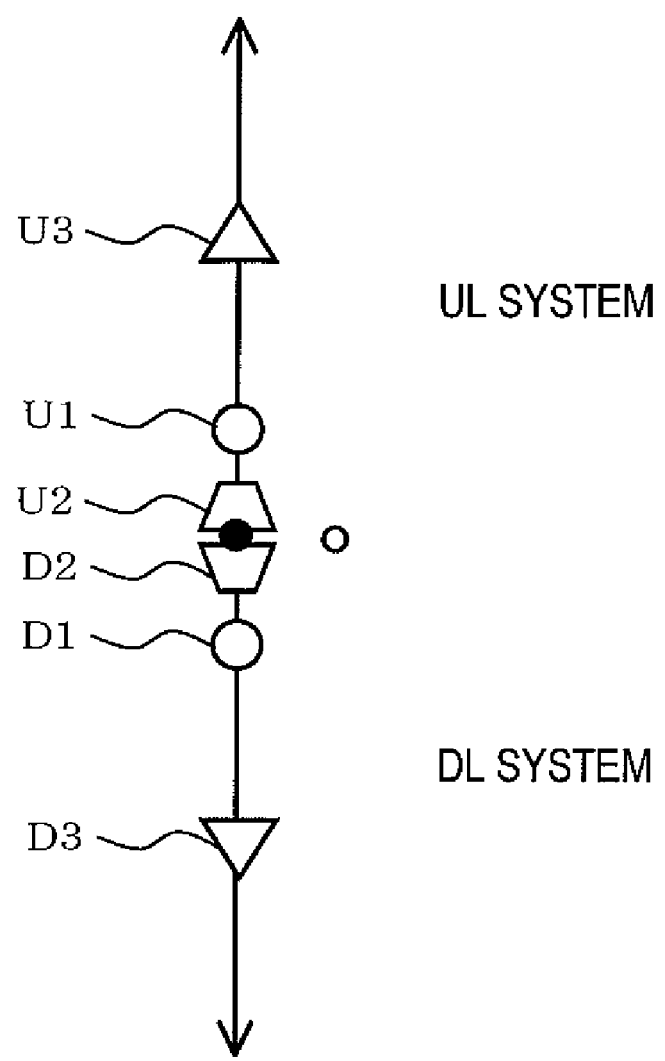
FIG. 9D explains a multichannel bidirectional communication system configuration method.

It is already evident that the C plane in FIG. 5C is equivalent to point O; FIG. 9D shows an example of the state for FIG. 5A through FIG. 8C.

Clearly there is symmetry about point O (the return point).

From the above, the position of point O can be selected arbitrarily, within a structurally significant range for the non-contact connector (10).

Hence a bidirectional system can always be configured.

The above is summarized in describing a method of configuration of a multichannel bidirectional communication system of this invention. (Of course, this method can also be applied to a single-channel system.)

Use the non-coaxial installation method to configure a multichannel DL (or UL) communication system in one direction.

Configure the UL (or DL) system as having vertical symmetry with the DL (or UL) system.

Cause both the DL system and UL system to return at selected point O on the rotation axis (4).

By following this procedure, a bidirectional system can be configured, and so configuration of a multichannel bidirectional communication system becomes extremely easy.

Figure 10B:
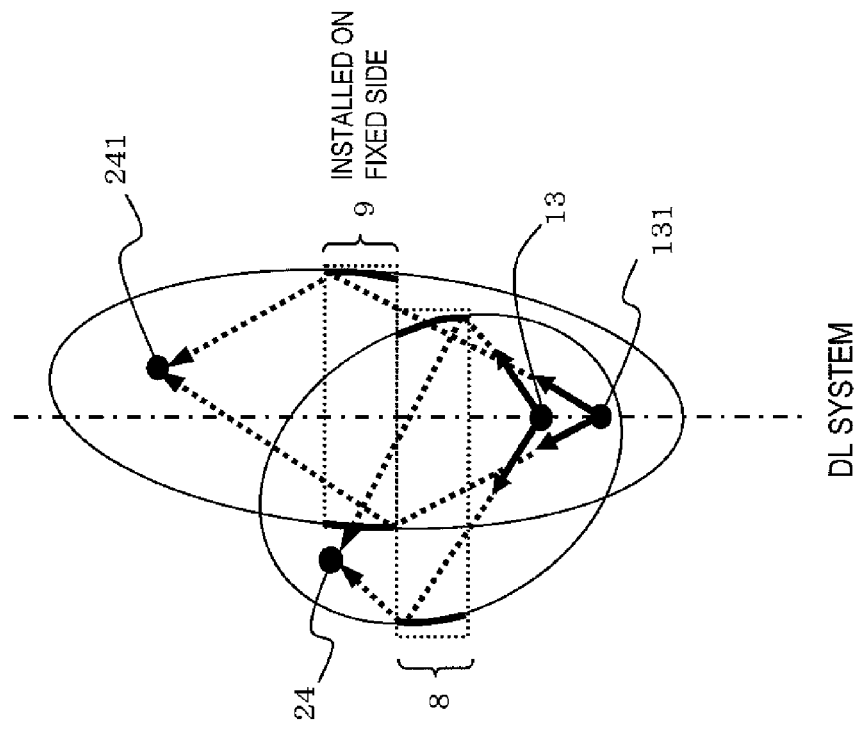
FIG. 10B explains a multichannel bidirectional communication system configuration method.
Figure 10A:
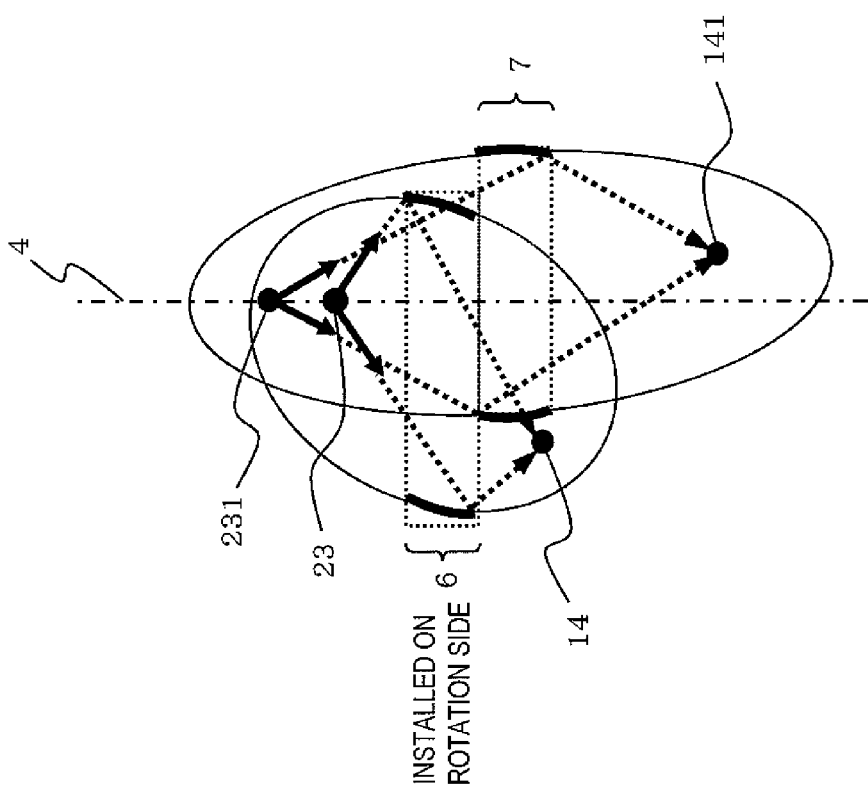
FIG. 10A explains a multichannel bidirectional communication system configuration method.
Figure 10C:
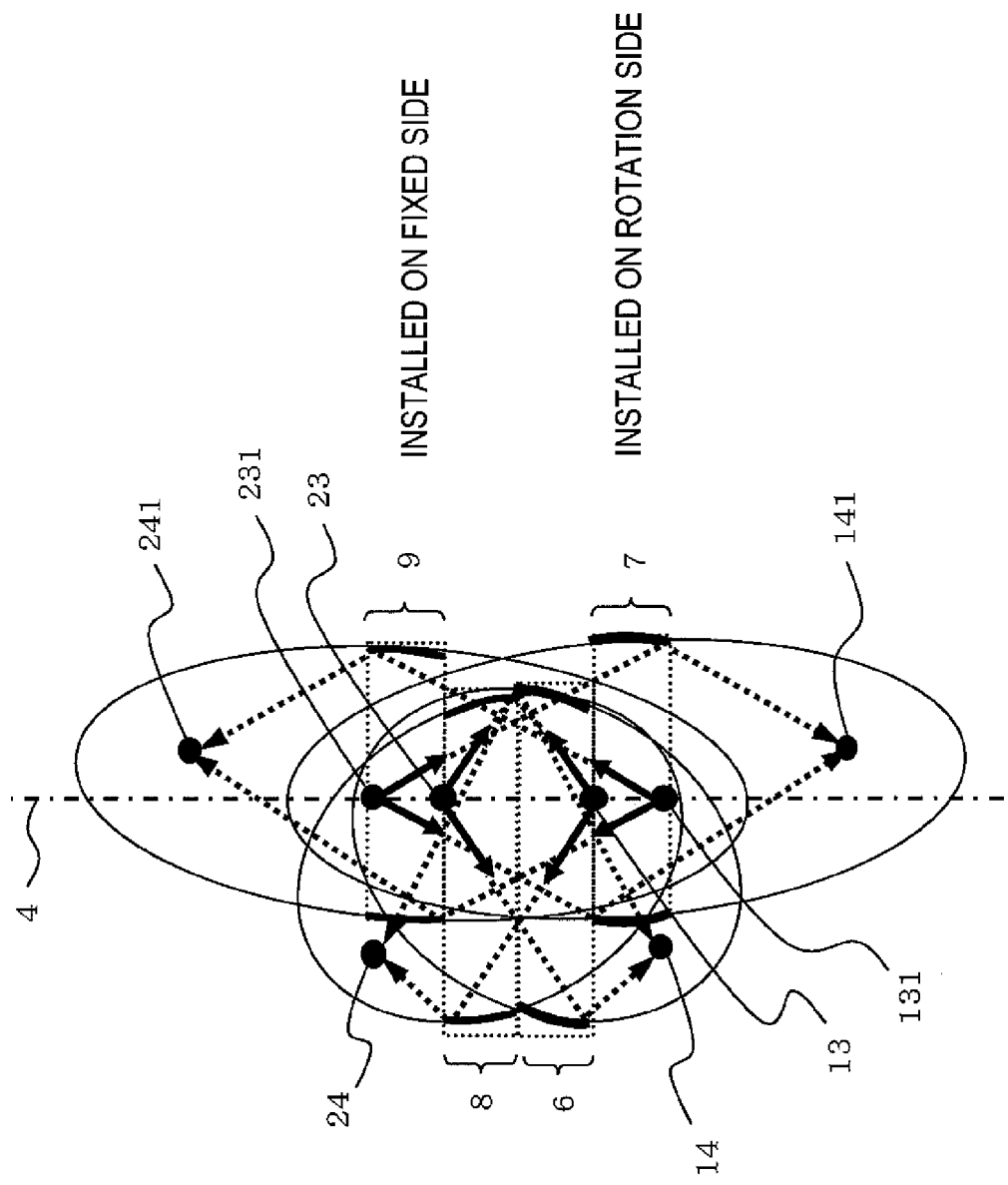
FIG. 10C explains a multichannel bidirectional communication system configuration method.

Finally, an example of the configuration of a 2-Ch simultaneous bidirectional communication system is shown in FIG. 10A and FIG. 10B.

A bidirectional system is configured based on the above procedure.

Next, examples of application of the above configuration method are described, for examples of 1-Ch bidirectional communication systems.

Figure 11B:
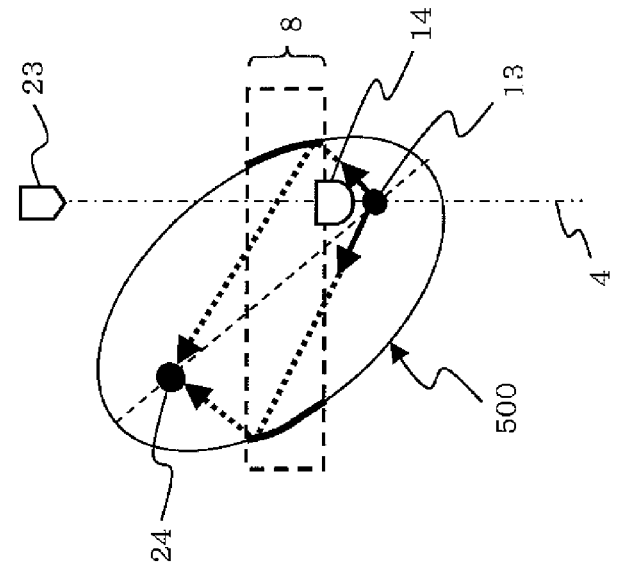
FIG. 11B shows the configuration of one bidirectional channel.
Figure 11A:
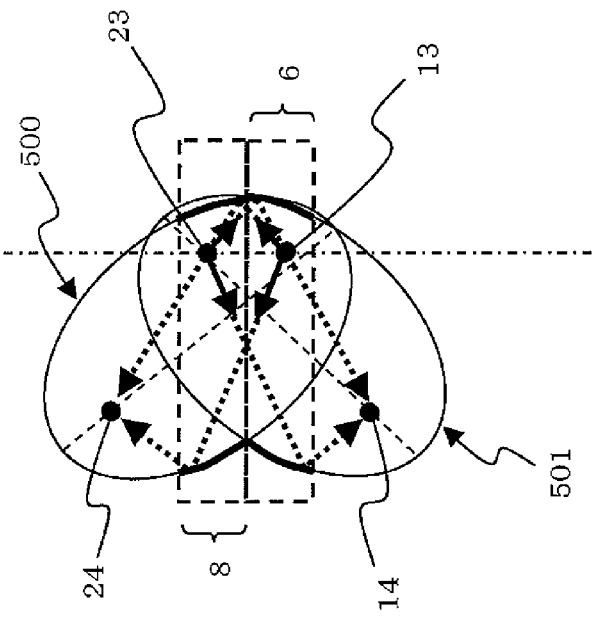
FIG. 11A shows the configuration of one bidirectional channel.

FIG. 11A: Examples of configuration of both a DL system and a UL system using this non-coaxial configuration method (the same as FIG. 7A through FIG. 7C)

Figure 11C:
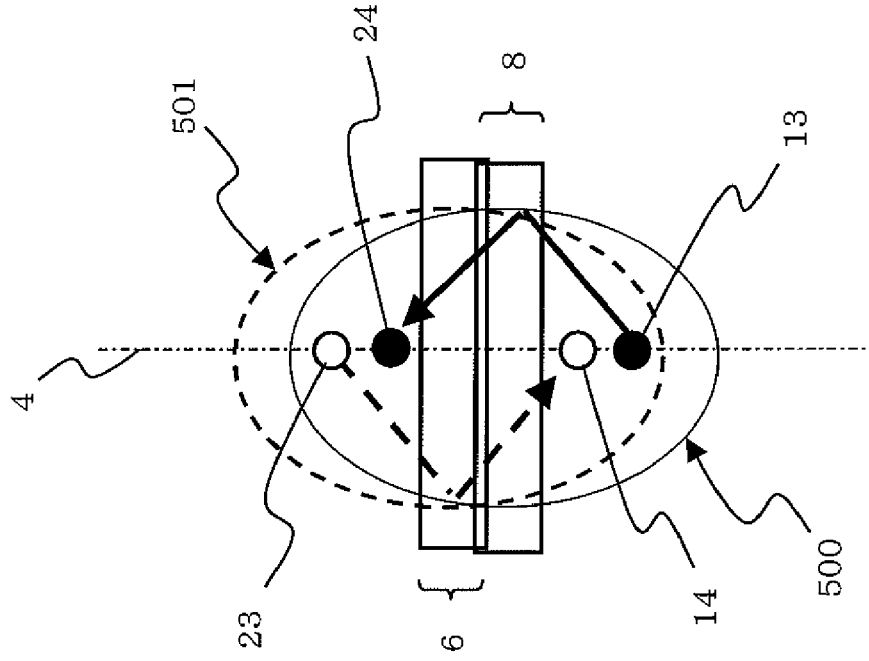
FIG. 11C shows the configuration of one bidirectional channel.

FIG. 11B: Example of a hybrid configuration, using the non-coaxial installation method for the DL system and the coaxial installation method for the UL system FIG. 11C: Example of non-coaxial configuration in which the off-axis angle is 0° for both the DL system and the UL system; this special state of an off-axis angle of 0° can be described as the coaxial configuration method, but the light-emitting elements are on the rotation axis 4. The most important feature of this example is that, in addition to the symmetry about the C plane (the plane at which the rotating body (1) and fixed body (2) are opposed) in FIG. 8C, there is also symmetry with respect to the rotation axis (4). That is, in specific design based on FIG. 11C, this latter feature can be utilized.

Figure 16:
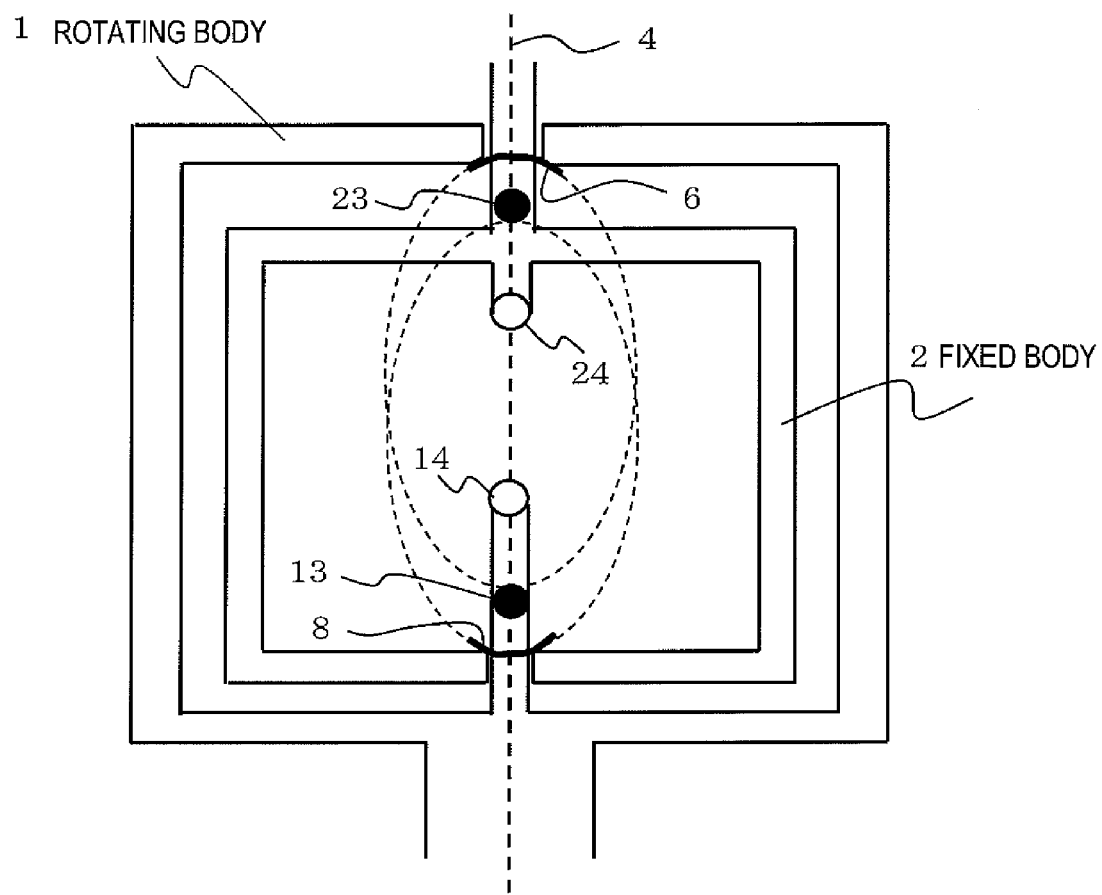
FIG. 16 shows an example of the configuration of an optical path using partial ellipsoidal mirrors.
Figure 17:
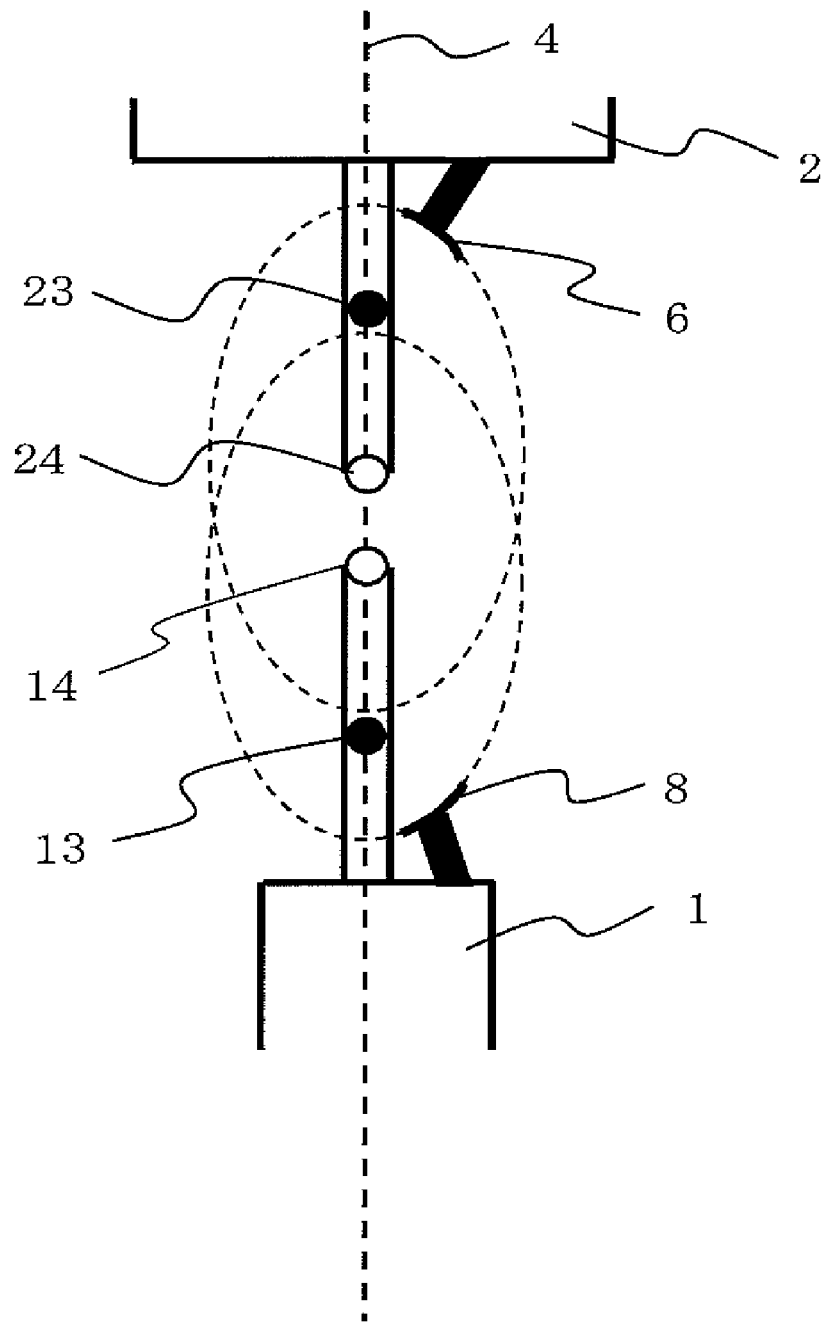
FIG. 17 shows an example of the configuration of an optical path using partial ellipsoidal mirrors.

First, when specific optical paths are configured using the above procedure, a result similar to FIG. 16 is obtained. In FIG. 16, the light-emitting element (13), light-receiving element (14), and rotation-side partial ellipsoidal reflecting mirror (6), mounted on the rotation side, are arranged on the rotating body (1) shown on the outside, and the light-emitting element (23), light-receiving element (24), and fixed-side partial ellipsoidal reflecting mirror (8), mounted on the fixed side, are arranged on the fixed body (2) shown on the inside. Clearly, a hole penetrating the support member for the fixed body (2) and the support member for the rotating body (1) is opened in the center portions of the rotation-side partial ellipsoidal reflecting mirror (6) and the fixed-side partial ellipsoidal reflecting mirror (8). If, for this bidirectional 1-Ch system shown in FIG. 16, the above "symmetry with respect to the rotation axis (4)" characteristic is applied to the configuration of FIG. 16, results FIG. 17. In FIG. 17, the rotation-side partial ellipsoidal reflecting mirror (6), which originally should be installed on the rotation side, is installed on the fixed side, and the fixed-side partial ellipsoidal reflecting mirror (8), which originally should be installed on the fixed side, is installed on the rotation side. In this way, a simplified optical path configuration can also be symmetric with respect to the rotation axis (4). Further, in this case, a partial ellipsoidal mirror rather than an elliptical ring as in FIG. 16 is sufficient, so that further simplification is possible.

Figure 12:
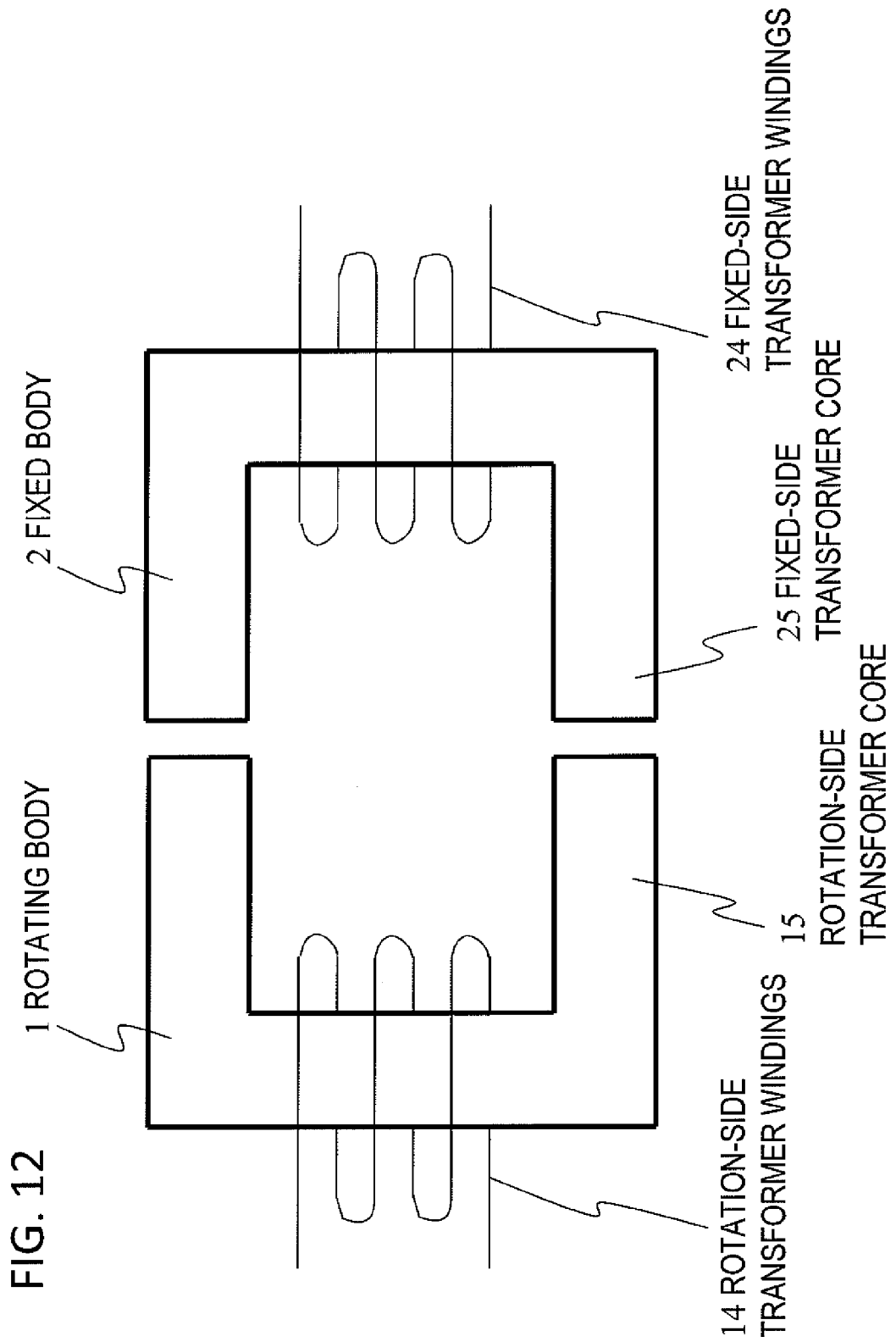
FIG. 12 shows an example of the configuration of a rotary transformer.

Next, FIG. 12 is used to explain power supply without contact from the fixed body (2) to the rotating body (1).

As explained above, the rotation-side transformer windings (15) are wound around the body portion of the rotation-side transformer core (16) of the rotating body (1), and the fixed-side transformer windings (25) are wound around the body portion of the fixed-side transformer core (26) of the fixed body (2). In this state, by passing a power supply current from the device on which the non-contact connector (10) is mounted to the fixed-side transformer windings (25), first a magnetic field is generated in the vicinity of the fixed-side transformer core (26). Next, because the rotation-side transformer core (16) is positioned opposing the fixed-side transformer core (26) which has generated a magnetic field, a magnetic circuit is formed, and a current appears in the rotation-side transformer windings (15) wound around the body portion (the so-called law of electromagnetic induction). By this means, power is supplied to the rotating body (1), and for example a rotation-side electrical circuit unit (11) is driven and the rotation-side light-emitting element (13) could be lit.

In the above, optical path configuration methods were described for cases in which ellipse shapes were used as quadratic curved-surface reflecting body shapes.

Here, reflecting body shapes which are either single paraboloid shapes, or combinations of two paraboloid shapes, such as shown in FIG. 13A through FIG. 13C, are described.

Clearly, installation of the light-emitting elements on the rotation axis (4) is the same, but the light-receiving elements are installed at positions which utilize the geometric characteristics of ellipsoid shapes and of paraboloid shapes respectively.

This means greater freedom of optical path configuration, and either an ellipsoid or a paraboloid shape may be selected according to the application.

Next, a blind mating function for the non-contact connector (10) is explained. In general, a blind mating function is a function in which the male side and female side of the connector to be mated are mated without visual confirmation, and the connector is made to act as a mated connector.

In the case of this non-contact connector (10), if the structure is modified such that the rotating body (1) can be inserted into the fixed body (2) to cause mating, then the rotating body (1) is equivalent to the male side (or female side) above, and the fixed body (2) is equivalent to the female side (or male side) above.

That is, when the rotating body (1) is inserted into and mated with the fixed body (2) without visual confirmation, the rotational angle position of the rotating body (1) is indefinite, but coupling of any one of the light-emitting elements with any one of the light-receiving elements is secured.

Hence after coupling, upon identifying each of the channels, action as a blind mating connector is possible.

The method of identification is described below.

That is, in this non-contact connector (10), regardless of the position in the rotation direction at which the rotating body (1) is mated, optical paths can always be formed between the rotation-side light-emitting element (13) and the fixed-side light-receiving element (24) and between the fixed-side light-emitting element (23) and the rotation-side light-receiving element (14), so that the non-contact connector (10) can be used as a blind mating connector.

Below, the above method of channel identification is described by explaining functions of the rotation-side electrical circuit unit 11 and fixed-side electrical circuit unit 21, using FIG. 14. This example is a case in which four channels of data (CH 1 to CH 4) are transmitted and received; between each of the rotation-side optical elements 133 to 136 and the corresponding fixed-side optical elements 233 to 236, one channel of data is transmitted and received.

The rotation-side electrical circuit unit 11 comprises interface (I/F) circuits 111 to 114, which process data in each of the channels, and driving circuits 115 to 118. Data from the device on which this non-contact connector 10 is mounted is input to the I/F circuits 111 to 114 and converted into data which can be processed within the electrical circuit unit 11. This data is then converted into optical element driving data by the driving circuits 115 to 118, and based on this driving data, light is caused to be emitted from each of the rotation-side optical elements 133 to 136.

The fixed-side electrical circuit unit 21 comprises reception circuits 2111 to 2114 and a switching circuit 2120, as well as I/F circuits 2121 to 2124. Data received by prescribed fixed-side optical elements 233 to 236 is converted in the reception circuits 2111 to 2114 into data which can be processes within the electrical circuit unit 21, and is output to the switching circuit 2120. In the switching circuit 2120, data received in each of the channels is switched to cause output from prescribed output stages. By this means, data in the first channel is caused to be output from the I/F circuit 2122, data in the second channel is caused to be output from the I/F 2123, and similarly, data can be caused to be output from output stages desired by the user. Switching control signals from external equipment can also be input to the switching circuit 2120 to switch to the desired output stages (so-called multiplex function).

Figure 15:
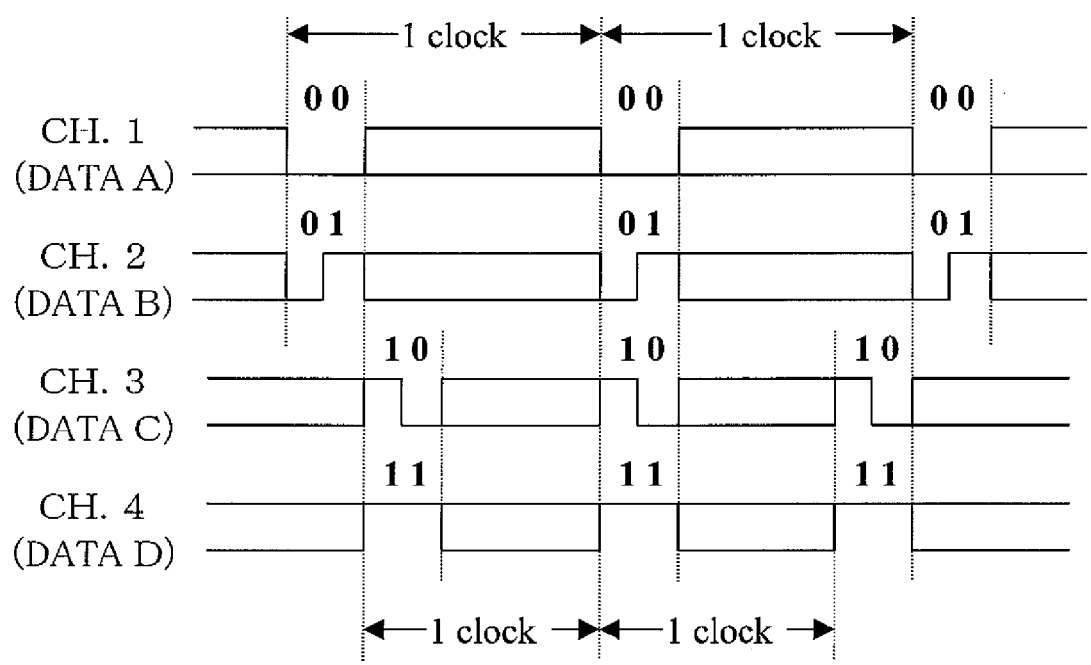
FIG. 15 shows an example of data with channel identification symbols inserted.

Further, as shown in FIG. 15, processing on the side of the device on which the non-contact connector 10 is mounted is performed to add identification symbols to data for each channel; these identification symbols may be discriminated by the switching circuit 2120 to perform switching. For example, when "00" is discriminated, data may be output to the I/F 2124 as "1" channel data, and similarly for other symbols.

Such channel identification symbol addition may be performed by a data processing circuit, not shown, of the device on which the non-contact connector 10, connected to the fixed body 2, is mounted, or may be performed by the driving circuits 115 to 118 of the rotation-side electric circuit 11. Also, rather than adding channel identification symbols to all the data for all channels, symbols may be added to one among the plurality of channels, to perform channel discrimination (dedicated line method).

In this way, by adding identification symbols to data, when multichannel data is received by the fixed body 2, the channel of the data can be identified and the data output to the prescribed output stage, the non-contact connector 10 can be provided with an automatic channel identification function, and a blind mating connector can be configured.

Further, this function also means that an automatic channel switching function can be realized in the non-contact connector 10.

Figure 14:
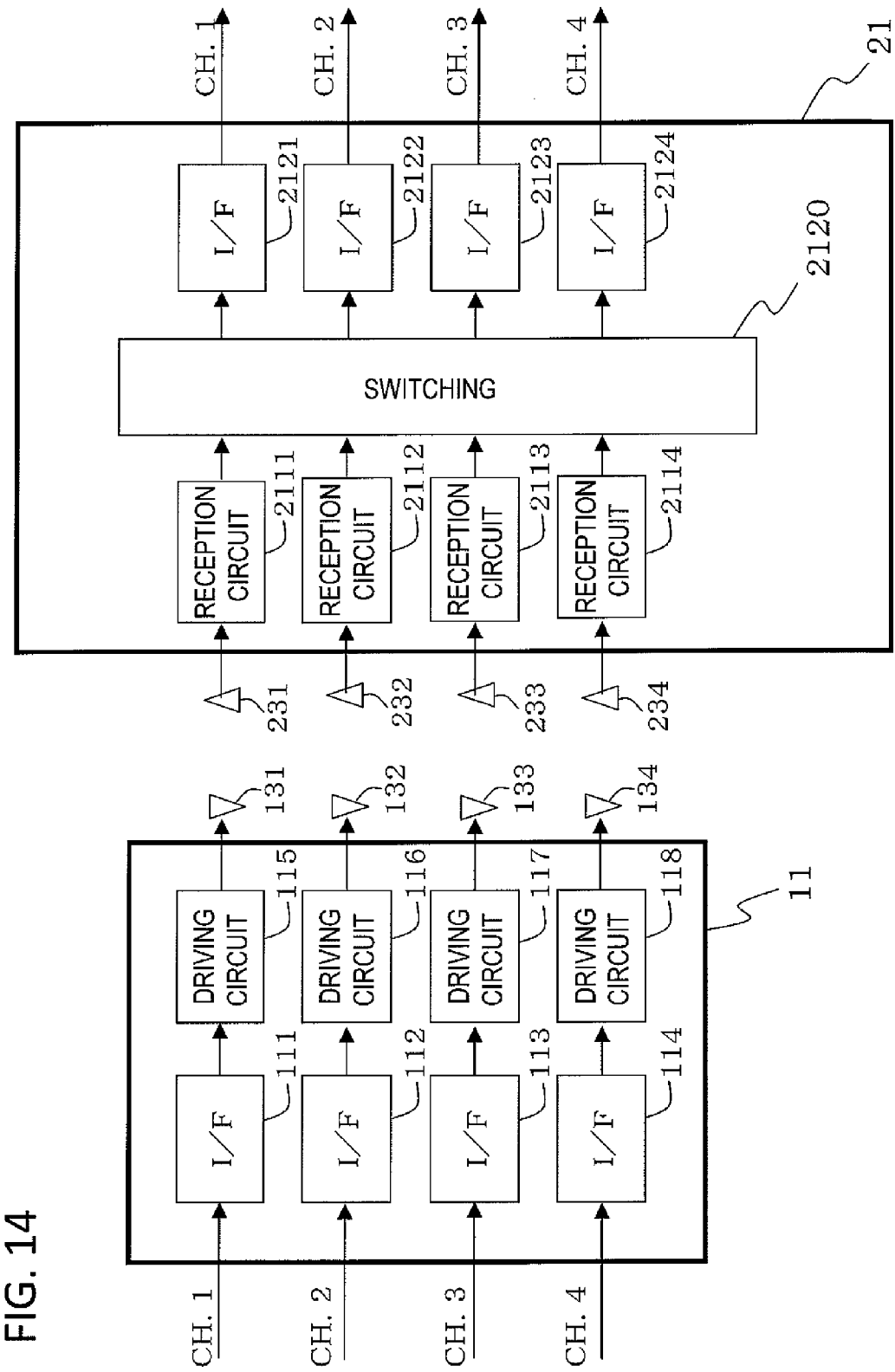
FIG. 14 shows an example of the configuration of an electrical circuit unit.

In the example shown in FIG. 14, the configurations of the electrical circuit units 11 and 21 are shown when the rotation-side optical elements 133 to 136 are light-emitting elements and the fixed-side optical elements 233 to 236 are light-receiving elements. In addition, the rotation-side optical elements 133 to 136 may be light-receiving elements, and the fixed-side optical elements 233 to 236 may be light-emitting elements. In this case, the rotation-side electrical circuit unit 11 comprises reception circuits 2111 to 2114, a switching circuit 2120, and I/F circuits 2121 to 2124, while the fixed-side electrical circuit unit 21 comprises I/F circuits 111 to 114 and driving circuits 115 to 118.

In the above, an example was described of an optical path formed by the rotation-side optical element 13 and fixed-side optical element 23, and by various reflecting bodies; however, the rotation-side optical element 13 and fixed-side optical element 23 may be replaced with optical fiber, and an optical path without interruption may be formed by the fixed-side optical fiber and rotation-side optical fiber.

FIG. 16 and FIG. 17 are figures showing an example of configuration of an optical path using partial ellipsoidal reflecting mirrors (6, 8).

As shown in FIG. 16, the rotating body 1 comprises a rotation-side light-emitting element (13), rotation-side light-receiving element (14), and second partial ellipsoidal reflecting mirror (6), and the fixed body 2 comprises a fixed-side light-emitting element (23), fixed-side light-receiving element (24), and first partial ellipsoidal reflecting mirror (8). Each portion from the first partial ellipsoidal reflecting mirror (8) to the second partial ellipsoidal reflecting mirror (6) is provided on the rotation axis 4. Also, the fixed body 2 is fixed in place via a center hole in the first partial ellipsoidal reflecting mirror (8), and the rotating body 1 is made rotatable via a center hole in the second partial ellipsoidal reflecting mirror (6).

Light emitted from the rotation-side light-emitting element (13) is reflected by the first partial ellipsoidal reflecting mirror (8) of the fixed body 2 and is incident on the fixed-side light-receiving element (24), and light emitted from the fixed-side light-emitting element (23) is reflected by the second partial ellipsoidal reflecting mirror (6) of the rotating body 1 and is incident on the rotation-side light-receiving element (14). Optical paths free of interruptions are formed in both directions. Portions may be provided such that the rotating body 1 shown in FIG. 16 is the fixed body 2 and the fixed body 2 is the rotating body 1; however, by placing the fixed body 2 on the inside as shown in FIG. 16, there is the advantageous result that the structure of the through-holes in the ellipsoidal mirrors (6, 8) is simplified.

FIG. 17 shows a configuration example for a case in which the positions of the partial ellipsoidal mirrors (6, 8) are shoulder positions of the ellipsoid, similar to LEDs of the prior art. The fixed-side light-receiving element (24) is closer to the side of the rotating body 1. In this case also, light emitted from the rotation-side light-emitting element (13) is reflected by the first partial ellipsoidal reflecting mirror (8) and is incident on the fixed-side light-receiving element (24), and light emitted from the fixed-side light-emitting element (23) is reflected by the second partial ellipsoidal reflecting mirror (6) and is incident on the rotation-side light-receiving element (14). Optical paths without interruption are formed in both directions between the rotating body 1 and the fixed body 2.

Figure 18:
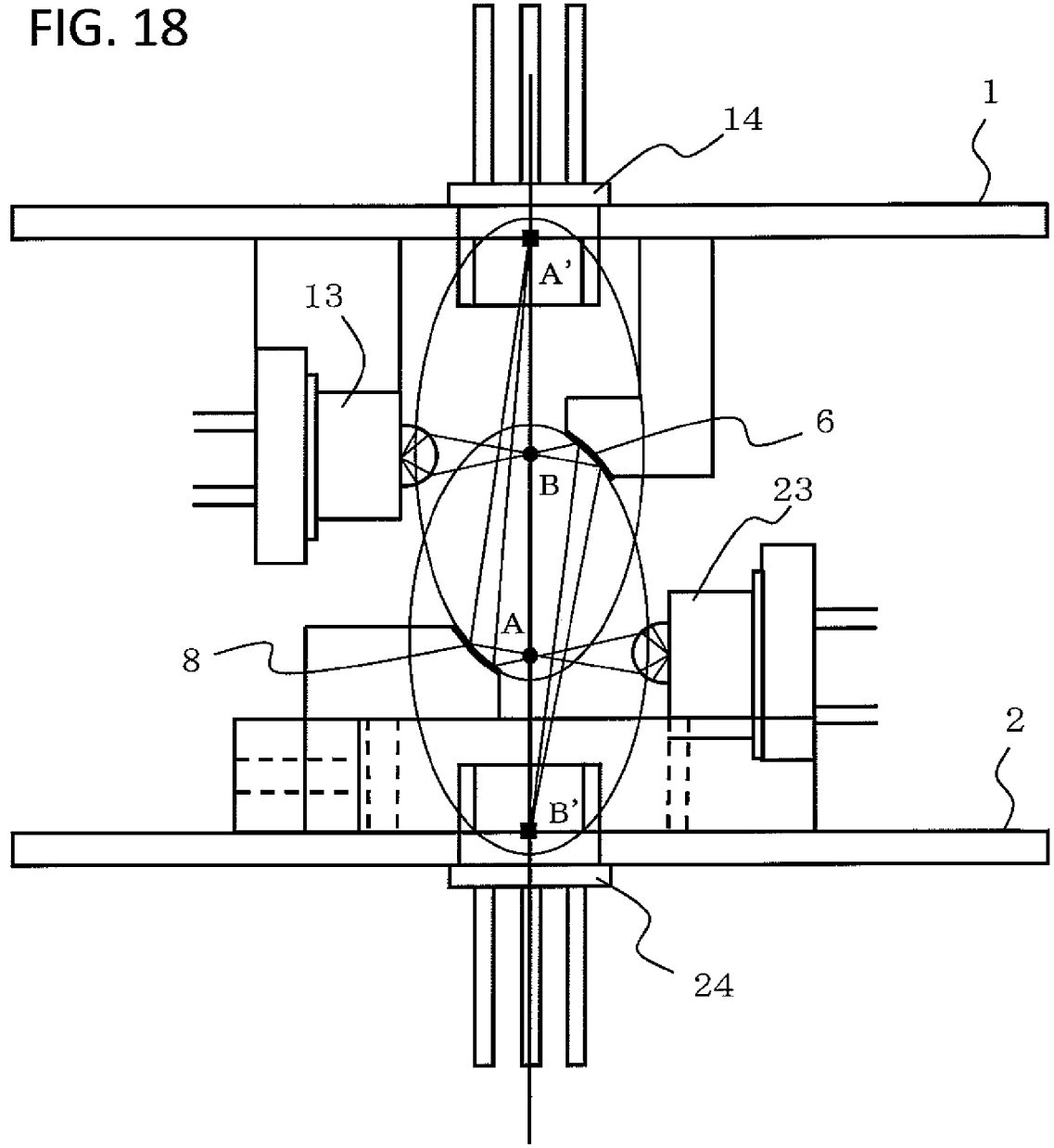
FIG. 18 shows an example of the configuration of an optical path using partial ellipsoidal mirrors.

FIG. 18 shows another configuration example using partial ellipsoidal mirrors (6, 8). Light emitted from the rotation-side light-emitting element (13) passes through focal point B and is reflected by the second partial ellipsoidal mirror (6) of the rotating body (1), and is incident on the fixed-side light-receiving element (24) at focal point B'. At this time, light from the rotation-side light-emitting element (13) is condensed at focal point B. An optical path similar to when light is emitted from focal point B is formed. Also, the second partial ellipsoidal mirror (6) is provided so as to condense light at the fixed-side light-receiving element (24). Hence because the fixed-side light-receiving element (24) receives condensed light, light can be received reliably, and the quantity of light is stable, compared with a case in which divergent light is received. Further, the rotation-side light-emitting element (13) and second partial ellipsoidal mirror (6) are fixed in the same plane of the rotating body (1). Hence the angle of incidence on the ellipsoidal surface is stable, and the reflected quantity of light and optical path are also stable. Design can be performed without considering fluctuation during rotational movement and similar.

On the other hand, light emitted from the fixed-side light-emitting element (23) passes through focal point A, is reflected by the first partial ellipsoidal mirror (8) of the fixed body (2), and is incident on the rotation-side light-receiving element (14) at the other focal point A'. Similarly in this case also, light from the fixed-side light-emitting element (23) is condensed at focal point A, so that an optical path similar to the case of light emitted from focal point A is formed. Further, the first partial ellipsoidal mirror (8) is provided so as to condense light at the rotation-side light-receiving element (14), so that light can be received reliably and the quantity of light is stable. Further, the fixed-side light-emitting element (23) and first partial ellipsoidal mirror (8) are in the same plane of the fixed body (2), so that the angle of incidence on the ellipsoidal surface is stable, and the reflected quantity of light and optical path are stable.

In the above-described example, entirely similar implementation is possible if the rotating body (1) and fixed body (2) are reversed.

What is claimed is:

1. A non-contact connector comprising:
   a rotation-side light-emitting element and a rotation-side light-receiving element, both positioned on a rotating body which rotates about a rotation axis;

a fixed-side light-emitting element and a fixed-side light-receiving element, both positioned on a fixed body;

a first partial ellipsoidal reflecting mirror installed on the fixed body, said first partial ellipsoidal reflecting mirror having two focal points; and a second partial ellipsoidal reflecting mirror, installed on the rotating body, said second partial ellipsoidal reflecting mirror having two focal points, with one of said focal points of said second partial ellipsoid reflecting mirror being portioned on said rotation axis, wherein an optical path is defined between the rotation-side light-emitting element and the fixed-side light-receiving element via the first partial ellipsoidal reflecting mirror, which is a portion of a three-dimensional elliptical reflecting body, and another optical path is defined between the fixed-side light-emitting element and the rotation-side light-receiving element via the second partial ellipsoidal reflecting mirror, which is a portion of a three-dimensional elliptical reflecting body, wherein data is exchanged in a non-contact state, and further wherein the rotation-side light-emitting element and the fixed-side light-receiving element are placed on the two focal points of the first partial ellipsoidal reflecting mirror and the fixed-side light-emitting element and the rotation-side light-receiving element are placed on the two focal points of the second partial ellipsoidal reflecting mirror.

2. The non-contact connector according to claim 1, wherein:

one of the focal points of the first partial ellipsoidal reflecting mirror and a focal point of a third partial ellipsoidal reflecting mirror are each positioned on the rotation axis, an optical path is defined in which light emitted from the rotation-side light-emitting element installed at the focal point of the first partial ellipsoidal reflecting mirror is reflected by the first partial ellipsoidal reflecting mirror and reaches the fixed-side light-receiving element installed at the other focal point of the first partial ellipsoidal reflecting mirror, and another optical path is defined in which light emitted from a rotation-side light-emitting element installed at the focal point of the third partial ellipsoidal reflecting mirror is reflected by the third partial ellipsoidal reflecting mirror and reaches a fixed-side light-receiving element installed at another focal point of the third partial ellipsoidal reflecting mirror, and a plurality of stages are employed to configure a plurality of optical paths directed from the rotation side toward the fixed side.

3. The non-contact connector according to claim 1, wherein:

one of the focal points of the first partial ellipsoidal reflecting mirror and a focal point of a third partial ellipsoidal reflecting mirror are each positioned on the rotation axis, a first optical path is defined in which light emitted from the rotation-side light-emitting element installed at the focal point of the first partial ellipsoidal reflecting mirror is reflected by the first partial ellipsoidal reflecting mirror and reaches the fixed-side light-receiving element installed at the other focal point of the first partial ellipsoidal reflecting mirror, and a third optical path is defined in which light emitted from a rotation-side light-emitting element installed at the focal point of the third partial ellipsoidal reflecting mirror is reflected by the third partial ellipsoidal reflecting mirror and reaches a fixed-side light-receiving element installed at another focal point of the third partial ellipsoidal reflecting mirror, a focal point of a fourth partial ellipsoidal reflecting mirror is placed on the rotation axis, a second optical path is defined to be symmetrical about a plane perpendicular to the rotation axis with the first and third optical paths, and in which light emitted from the fixed-side light-emitting element installed at the focal point of the second partial ellipsoidal reflecting mirror is reflected by the second partial ellipsoidal reflecting mirror and reaches the rotation-side light-receiving element installed at the other focal point of the second partial ellipsoidal reflecting mirror, and a fourth optical path is defined in which light emitted from a fixed-side light-emitting element installed at a focal point of the fourth partial ellipsoidal reflecting mirror is reflected by the fourth partial ellipsoidal reflecting mirror and reaches a rotation-side light-receiving element installed at the other focal point of the fourth partial ellipsoidal reflecting mirror, and a plurality of stages are employed to configure a plurality of optical paths directed from the fixed side toward the rotation side.

4. The non-contact connector according to claim 3, wherein a structure comprising the first and third optical paths directed from the rotation side toward the fixed side, and a structure comprising the second and fourth optical paths directed from the fixed side toward the rotation side, are arranged symmetrically about a plane perpendicular to the rotation axis, to configure a simultaneous bidirectional communication system.

5. The non-contact connector according to claim 1, wherein a bidirectional communication system comprises:

one optical path in which light emitted from the rotation-side light-emitting element installed at the focal point of the first partial ellipsoidal reflecting mirror on the rotation axis is reflected by the first partial ellipsoidal reflecting mirror and reaches the fixed-side light-receiving element installed at the other focal point of the first partial ellipsoidal reflecting mirror; and one optical path in which light emitted from the fixed-side light-emitting element installed at the focal point of the second partial ellipsoidal reflecting mirror on the rotation axis is reflected by the second partial ellipsoidal reflecting mirror and reaches the rotation-side light-receiving element installed at the other focal point of the second partial ellipsoidal reflecting mirror.

6. The non-contact connector according to claim 1, wherein a bidirectional communication system comprises:

one optical path in which light emitted from the rotation-side light-emitting element installed the focal point of the first partial ellipsoidal reflecting mirror on the rotation axis is reflected by the first partial ellipsoidal reflecting mirror and reaches the fixed-side light-receiving element installed at the other focal point of the first partial ellipsoidal reflecting mirror, and one optical path in which light emitted from the fixed-side light-emitting element installed on the rotation axis is directly incident on the rotation-side light-receiving element installed in opposition on the rotation axis.

7. The non-contact connector according to claim 1, wherein a bidirectional communication system comprises:

one optical path in which light emitted from the rotation-side light-emitting element installed at the focal point on the rotation axis of the first partial ellipsoidal reflecting mirror is reflected by the first partial ellipsoidal reflecting mirror and reaches the fixed-side light-receiving element installed at the other focal point of the first partial ellipsoidal reflecting mirror, set on the rotation axis, and one optical path in which light emitted from the fixed-side light-emitting element installed at the focal point on the rotation axis of the second partial ellipsoidal reflecting mirror is reflected by the second partial ellipsoidal reflecting mirror and reaches the rotation-side light-receiving element installed at the other focal point of the second partial ellipsoidal reflecting mirror, set on the rotation axis.

8. The non-contact connector according to claim 1, further comprising a transformer core and transformer windings in each of the rotating body and fixed body, wherein the rotating body and the fixed body form a rotary transformer.

9. The non-contact connector according to claim 1, further comprising a blind mating function, in which the rotating body and the fixed body are mutually mateable, wherein an optical path is formed between the rotation-side optical element and the fixed-side optical element regardless of the rotational position, in the direction of rotation of the rotating body, in which the rotating body mates.

10. The non-contact connector according to claim 1, wherein the second partial ellipsoidal reflecting mirror and a fourth partial ellipsoidal reflecting mirror, installed on the rotating body, and the first partial ellipsoidal reflecting mirror and a third partial ellipsoidal reflecting mirror, installed on the fixed body, are respectively formed by two paraboloid reflecting bodies.

11. The non-contact connector according to claim 1, wherein:

the rotation-side light-emitting and light-receiving elements and, and the fixed-side light-emitting and light-receiving elements comprise optical fibers, and an optical path is formed between the optical fibers.

12. The non-contact connector according to claim 1, wherein:

the focal points of the first partial ellipsoidal reflecting mirror and the second partial ellipsoidal reflecting mirror are each placed on the rotation axis, and an optical path is defined in which light emitted from the rotation-side light-emitting element passes through one of the focal points of the second partial ellipsoidal reflecting mirror, is reflected by the second partial ellipsoidal reflecting mirror, and reaches the fixed-side light-receiving element, and an optical path is defined in which light emitted from the fixed-side light-emitting element passes through one of the focal points of the first partial ellipsoidal reflecting mirror, is reflected by the first partial ellipsoidal reflecting mirror, and reaches the rotating-side light-receiving element.

13. The non-contact connector according to claim 12, wherein:

the rotating-side light-emitting element and the second partial ellipsoidal reflecting mirror are arranged in the same plane, and the fixed-side light-emitting element and the first partial ellipsoidal reflecting mirror are arranged in the same plane.

* * * * *